(12) United States Patent
Nakano et al.

(10) Patent No.: US 7,925,893 B2
(45) Date of Patent: Apr. 12, 2011

(54) COPYRIGHT PROTECTION SYSTEM, MODULAR EXPONENTIATION OPERATION APPARATUS, AND MODULAR EXPONENTIATION OPERATION METHOD

(75) Inventors: Toshihisa Nakano, Neyagawa (JP); Attrapadung Nuttapong, Koto-ku (JP); Kazukuni Kobara, Mitaka (JP); Hideki Imai, Yokohama (JP)

(73) Assignee: Panasonic Corporation, Osaka (JP)

( * ) Notice: Subject to any disclaimer, the term of this patent is extended or adjusted under 35 U.S.C. 154(b) by 1065 days.

(21) Appl. No.: 10/557,723

(22) PCT Filed: May 24, 2004

(86) PCT No.: PCT/JP2004/007411
§ 371 (c)(1),
(2), (4) Date: Mar. 12, 2007

(87) PCT Pub. No.: WO2004/114584
PCT Pub. Date: Dec. 29, 2004

(65) Prior Publication Data
US 2007/0147603 A1  Jun. 28, 2007

(30) Foreign Application Priority Data
May 22, 2003 (JP) ................ 2003-145215

(51) Int. Cl.
G06F 11/30 (2006.01)
G06F 12/14 (2006.01)
(52) U.S. Cl. .................. 713/193; 380/28; 726/26
(58) Field of Classification Search .......... 713/193
See application file for complete search history.

(56) References Cited

U.S. PATENT DOCUMENTS
2002/0076204 A1  6/2002 Nakano et al.

2003/0142826 A1 * 7/2003 Asano ................ 380/277
(Continued)

FOREIGN PATENT DOCUMENTS
JP  2002-281013  9/2002
(Continued)

OTHER PUBLICATIONS

Tomoyuki Asano, "Efficient Broadcast Encryption Methods Based on a Key Tree Structure", Proceedings of the 2003 Symposium on Cryptography and Information Security, vol. I of II, pp. 209 to 214, Jan. 26, 2003 (along with partial English translation).

(Continued)

*Primary Examiner* — Kimyen Vu
*Assistant Examiner* — Yogesh Paliwal
(74) *Attorney, Agent, or Firm* — Wenderoth, Lind & Ponack, L.L.P.

(57) ABSTRACT

A copyright protection system is provided that keeps manufacturing costs down regardless of the total number of playback apparatuses belonging to the system. In this system, a device key generating unit of a key management apparatus performs a modular exponentiation operation on a random number with an inverse element of a product of predetermined prime numbers, so as to generate and distribute device keys to playback apparatuses in one-to-one correspondence. A key revocation data generating unit generates, as key revocation data, information identifying the prime numbers used by an unrevoked playback apparatus to generate a decryption key from its device key and distributes the key revocation data along with an encrypted content to each playback apparatus. Playback apparatuses each attempt to generate a description key based on the key revocation data, and only those playback apparatuses that have successfully generated a decryption key are able to decrypt the encrypted content.

4 Claims, 19 Drawing Sheets

U.S. PATENT DOCUMENTS

2003/0182565 A1 9/2003 Nakano et al.
2004/0030905 A1* 2/2004 Chow et al. .................. 713/189

FOREIGN PATENT DOCUMENTS

JP  2003-169048  6/2003
JP  2003-273862  9/2003

OTHER PUBLICATIONS

Tomoyuki Asano, "A Revocation Scheme with Minimal Storage at Receivers", Lecture Notes in Computer Science, vol. 2501, pp. 433 to 450, Apr. 17, 2003.

* cited by examiner

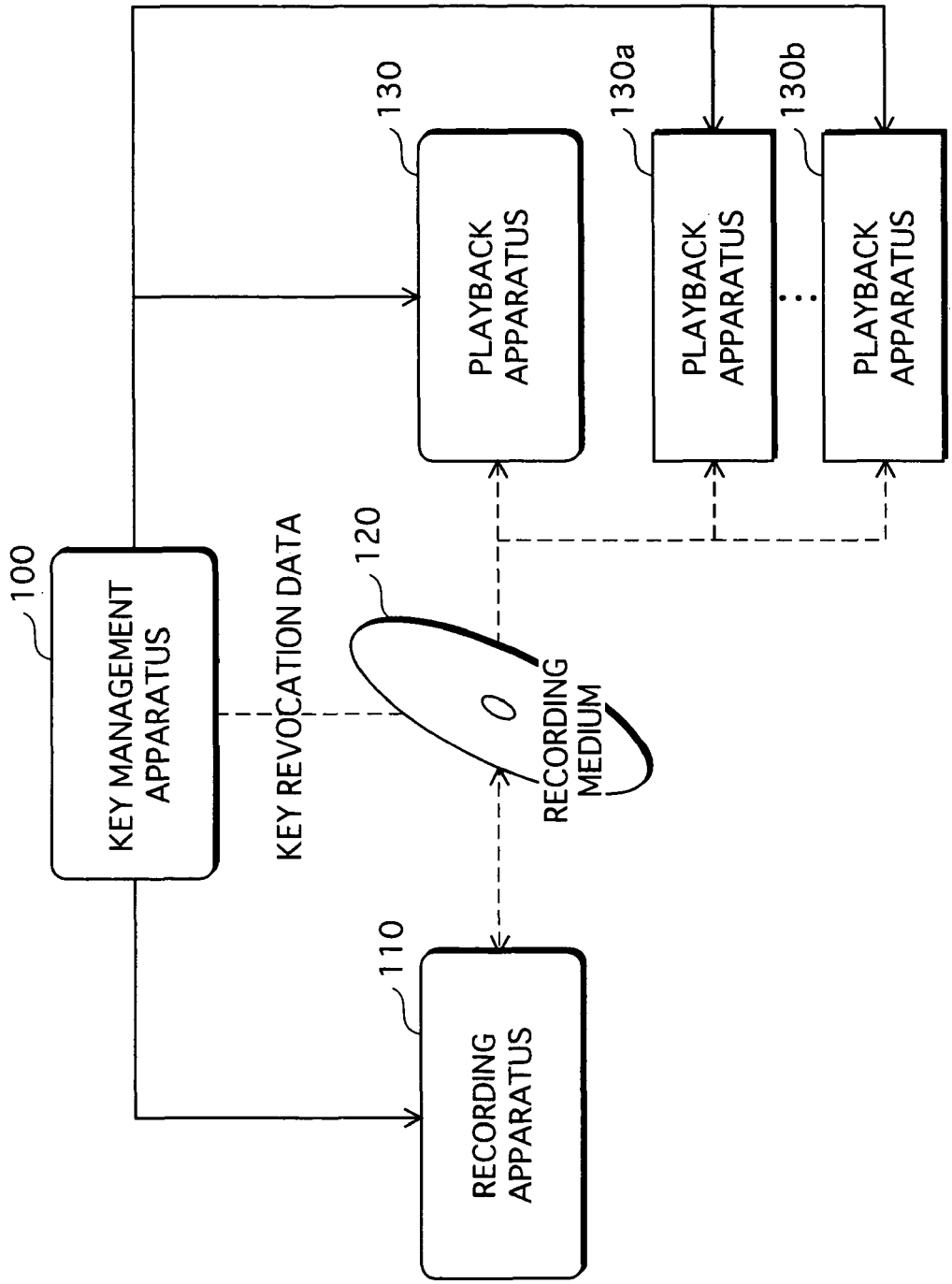

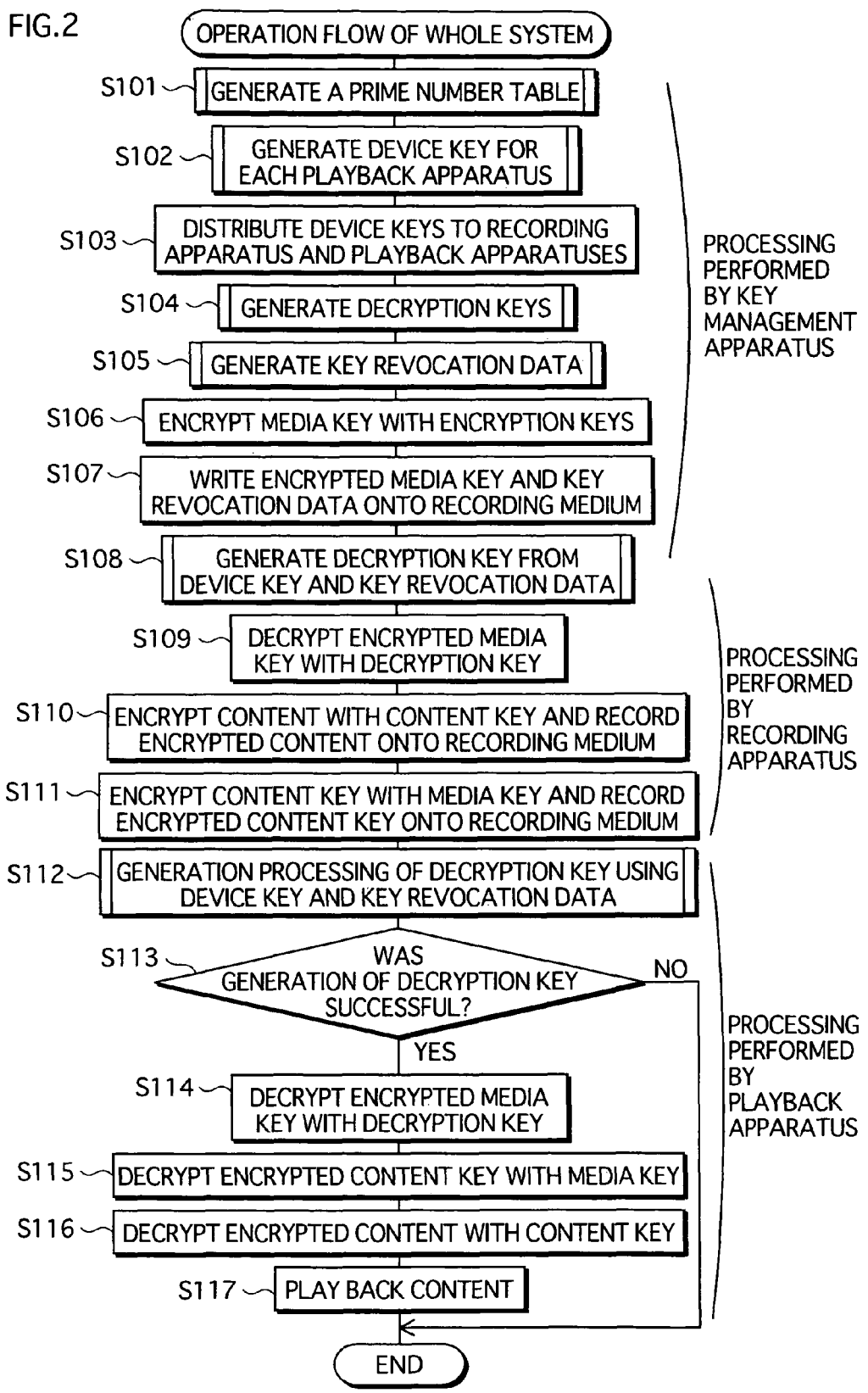

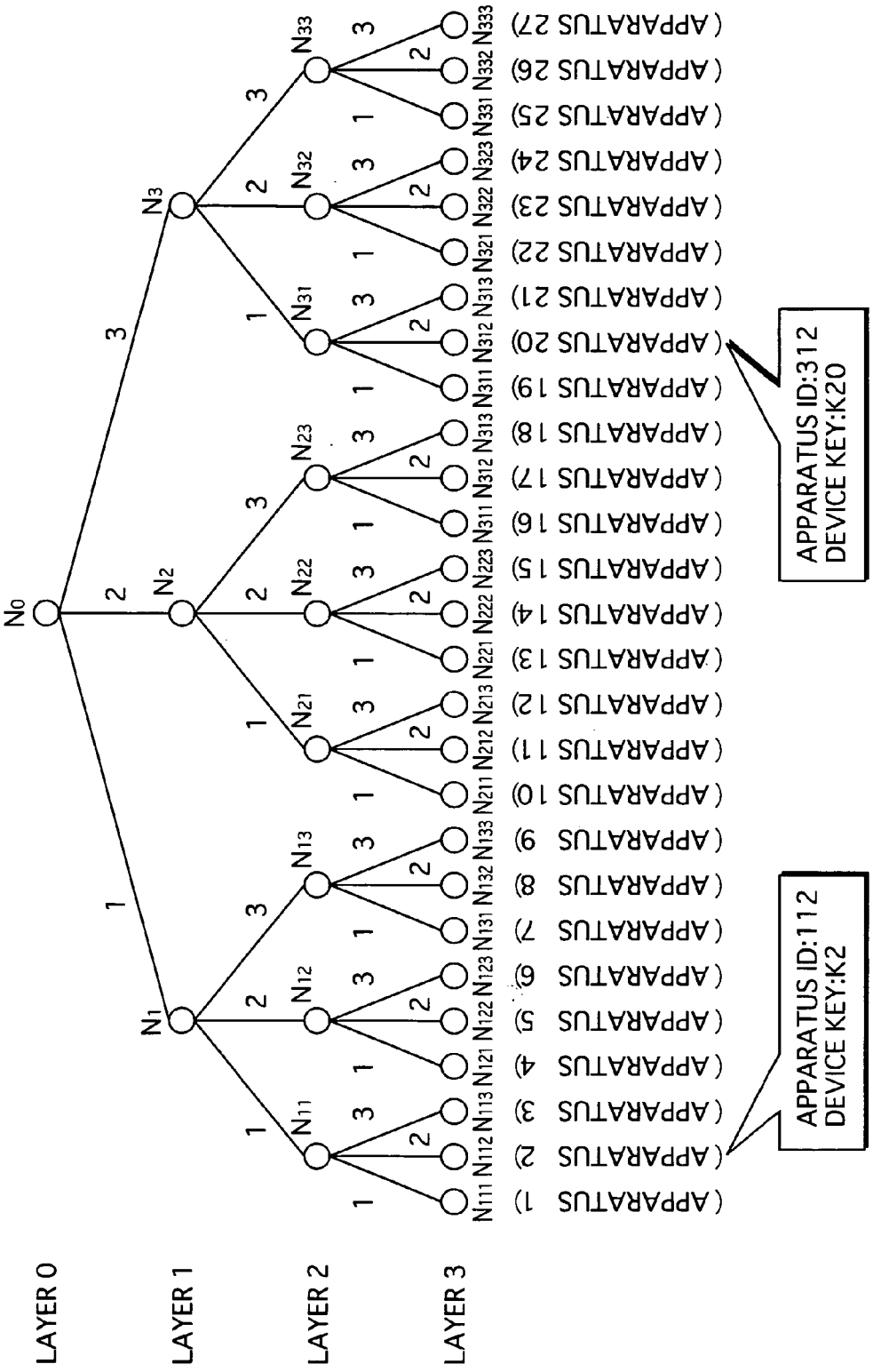

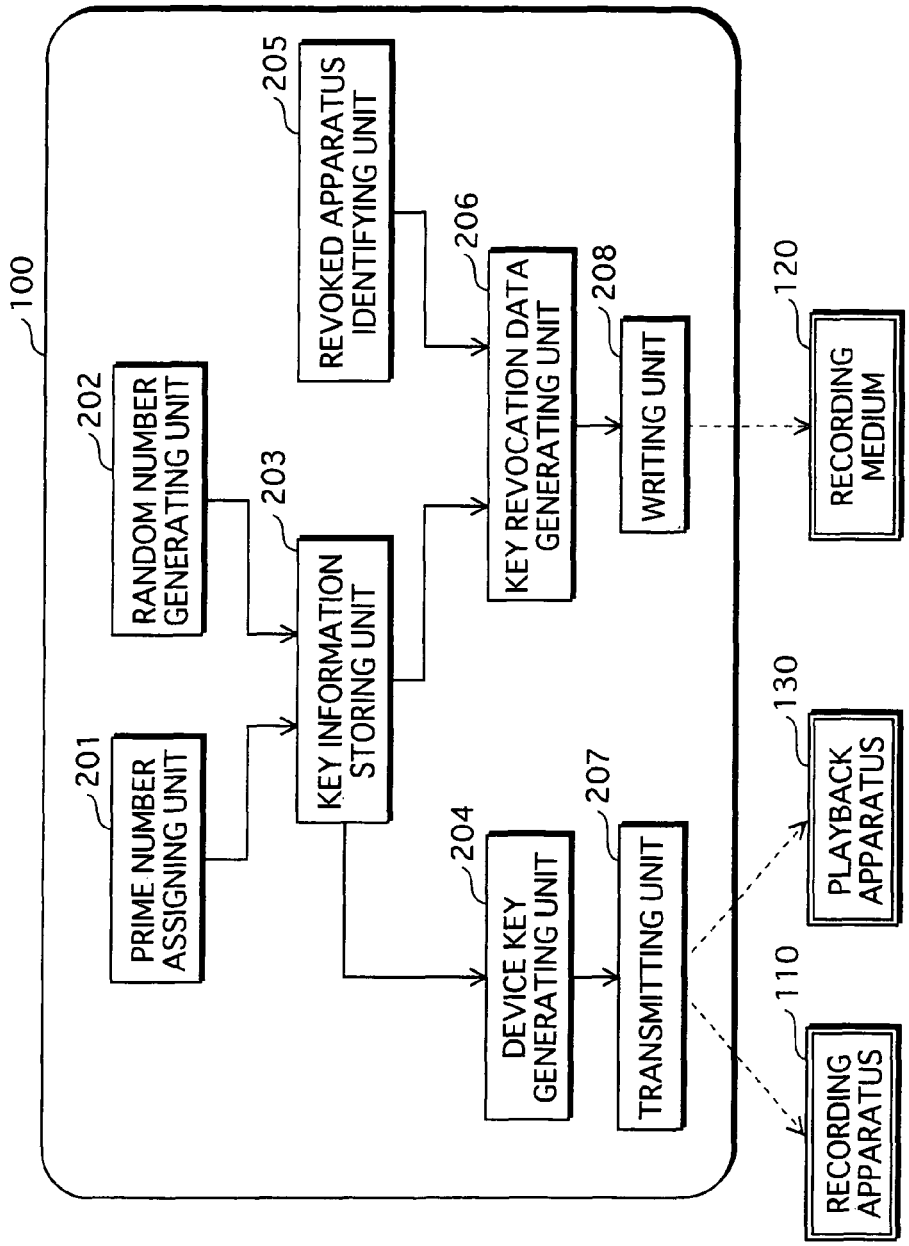

FIG.5A

TERNARY TREE

| 1 | $P_1$ |
|---|---|
| 2 | $P_2$ |
| 3 | $P_3$ |
| 12 | $P_{12}$ |
| 13 | $P_{13}$ |
| 23 | $P_{23}$ |

FIG.5B

FOUR-ARY TREE

| 1 | $P_1$ |
|---|---|
| 2 | $P_2$ |
| 3 | $P_3$ |
| 4 | $P_4$ |
| 12 | $P_{12}$ |
| 13 | $P_{13}$ |
| 14 | $P_{14}$ |
| 23 | $P_{23}$ |
| 24 | $P_{24}$ |
| 34 | $P_{34}$ |
| 123 | $P_{123}$ |
| 124 | $P_{124}$ |
| 134 | $P_{134}$ |
| 234 | $P_{234}$ |

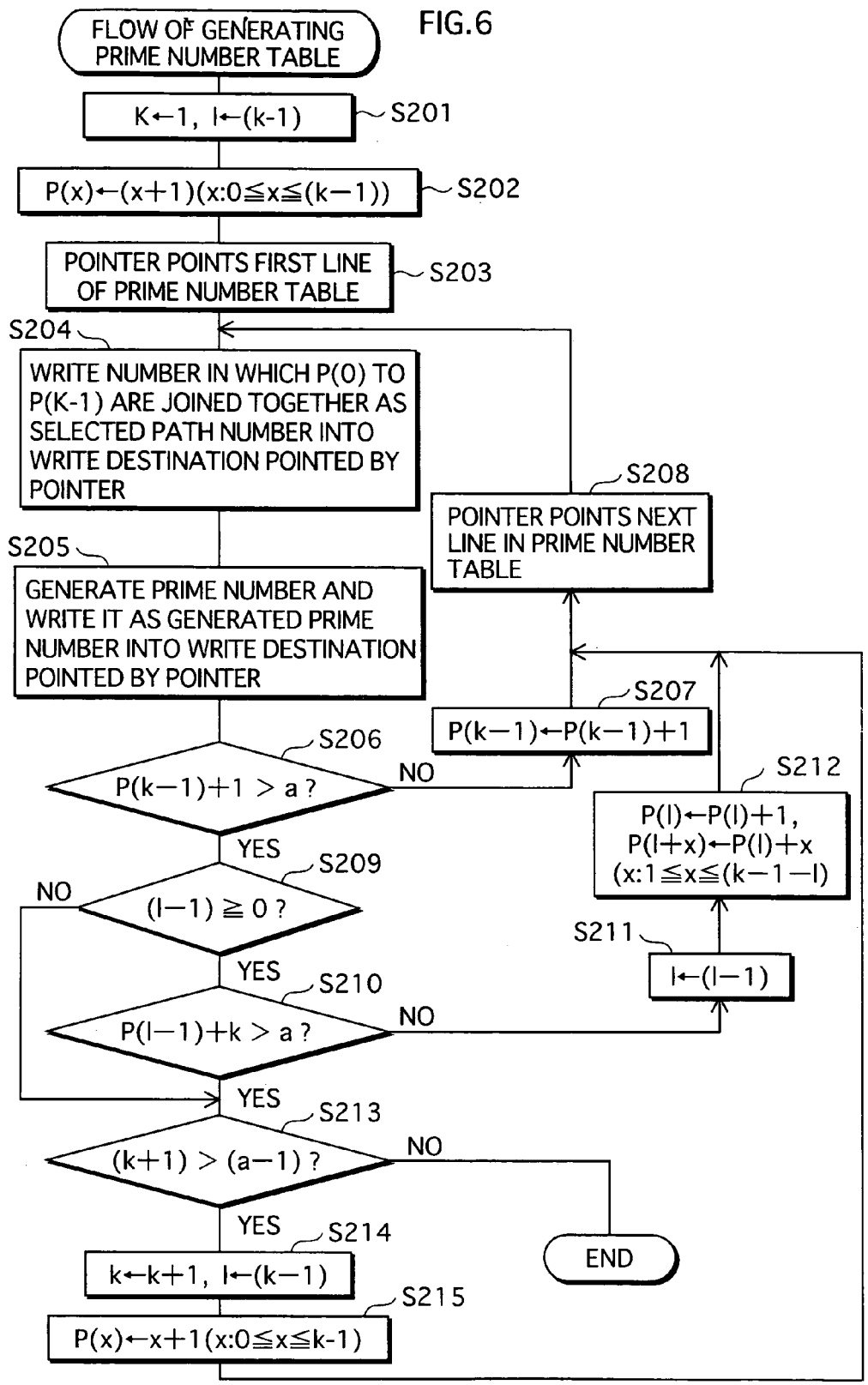

FIG.9

REVOCATION TABLE

| 0 | 1 | 2 |
|---|---|---|
| 1 | 1 | 23 |
| 2 | 0 | 0 |
| 3 | 1 | 12 |
| 11 | 1 | 23 |
| 12 | 0 | 0 |
| 13 | 0 | 0 |
| 21 | 0 | 0 |
| 22 | 0 | 0 |
| 23 | 0 | 0 |
| 31 | 0 | 0 |
| 32 | 0 | 0 |
| 33 | 1 | 13 |

FIG.11A

| 0 | 2 | E(ke1, Km) |
|---|---|---|
| 1 | 23 | E(ke2, Km) |
| 3 | 12 | E(ke3, Km) |
| 11 | 23 | E(ke4, Km) |
| 33 | 13 | E(ke5, Km) |

FIG.11B

| 0 | 123 | E(S, Km) |
|---|---|---|

COPYRIGHT PROTECTION SYSTEM, MODULAR EXPONENTIATION OPERATION APPARATUS, AND MODULAR EXPONENTIATION OPERATION METHOD

TECHNICAL FIELD

The present invention relates to a system used to record and play back contents that contain movies, music, and the like of which copyrights should be protected, onto and from large-capacity recording media such as optical discs, and particularly relates to a technique for preventing illegitimate apparatuses that do not protect the copyrights from playing back the contents in a normal manner.

BACKGROUND ART

In recent years, due to development of technology related to multimedia, such as improvement in the processing speed of video images by a computer, increase in the capacity of recording media, e.g. optical discs, and improvement in the speed of communication lines, one of flourishing businesses is the one for distributing digital contents (hereafter, simply referred to as contents) that contain video and audio and are large in data size, via large-capacity recording media, a network, or a broadcast system. In such a business, it is very important to protect the copyrights of the contents.

In a system that distributes contents while protecting the copyrights, encryption techniques are often used. A distribution apparatus encrypts a content and distributes the encrypted content. A playback apparatus decrypts the encrypted content using a decryption key that has been distributed in advance.

In such a system, in anticipation of having such a key disclosed to an external party by an illegitimate user who analyzes the inside of the playback apparatus and the like, key revocation techniques are also used in addition to encryption techniques, in order to disable the once-disclosed key to decrypt contents to be supplied in the future (See Patent Document 1).

The system disclosed in Patent Document 1 manages playback apparatuses using a structure called a tree structure having N hierarchical layers (where N is a natural number being two or larger). Each playback apparatus stores therein N pieces of device keys that are positioned on the nodes along the path from the bottom end to the top end of the tree structure to which the playback apparatus corresponds. The playback apparatus decrypts a corresponding encrypted-text and obtains a media key, using a device key that is specified from among the N pieces of device keys based on information recorded on the recording medium, decrypts the encrypted content, and plays back the content. As many encrypted texts as the number of valid device keys are recorded on the recording medium.

According to a conventional key revocation technique, however, the number of keys stored in an apparatus is in proportion to the number of hierarchical layers (hereafter, simply referred to as the height) in the hierarchical structure called a tree structure. The height of the hierarchical layers of the tree structure is in proportion to the logarithm of the total number of apparatuses supported by the copyright protection system. Thus, the larger the total number of the apparatuses belonging to the system, the more keys each apparatus needs to store therein. It means that each apparatus needs to have a larger memory capacity for storing the keys, and consequently, the manufacturing costs of each apparatus increase.

In view of the aforementioned problem, the present invention aims to provide a copyright protection system with which is it possible to keep the manufacturing costs down regardless of the total number of the apparatuses belonging to the system.

Patent Document 1
Japanese Unexamined Patent Application Publication No. 2002-281013

SUMMARY OF THE INVENTION

The present invention provides a copyright protection system including a distribution system and a playback apparatus, wherein the distribution system comprises: an operand storing unit storing therein an operand S being a natural number; a selecting unit operable to select as many prime numbers as expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; a first calculating unit operable to perform a modular exponentiation operation over a finite field, the modular exponentiation operation seeking a value expressed by $S'=S^{1/P}$ mod N where N is a product of a prime number p and a prime number q, the prime numbers p and q are larger than a predetermined value, and P is a product of all the prime numbers selected by the selecting unit; an encrypting unit operable to encrypt a content using the operand S; and a distributing unit operable to distribute the encrypted content and first specification information that specifies the selected prime numbers, and the playback apparatus comprises: an obtaining unit operable to obtain the encrypted content and second specification information that specifies one or more prime numbers; a result storing unit pre-storing therein the value S'; a second calculating unit operable to perform a modular exponentiation operation over a finite field, the modular exponentiation operation being defined by $(S')^Q$ mod N where N is the product of the prime number p and the prime number q, the prime numbers p and q are larger than the predetermined value, and Q is a product of all the prime numbers specified in the second specification information; and a decrypting unit operable to decrypt the obtained encrypted content using a result of the calculation by the second calculating unit.

With this arrangement, it is possible to provide a system in which only one key is distributed to the playback apparatus, the one key being a first key, which is a modular exponentiation operation result obtained by the distribution system, so that the playback apparatus obtains a second key from the first key and decrypts information using the second key.

With regards to the first key, in the case where there is an arrangement wherein the playback apparatus obtains the second key by further performing a modular exponentiation operation on the first key with all prime numbers that have been used in the modular exponentiation operation by the distribution system except for one prime number, it is difficult, in terms of the amount of calculation required, for the playback apparatus to obtain the second key from a third key which is the modular exponentiation operation result on which a modular exponentiation operation has not been performed with the inverse element of the excluded prime number. In this case, whether or not it is possible to generate the second key used for encryption and decryption from the first key depends on which prime number is selected as the excluded prime number.

The present invention further provides a modular exponentiation operation apparatus comprising: a storing unit storing therein an operand S being a natural number; a reading unit operable to read the operand S from the storing unit; a selecting unit operable to select as many prime numbers as expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; and a calculating unit operable to perform a modular exponentiation operation over a finite field, the modular exponentiation operation seeking a value expressed by $S'=S^{1/P}$ mod N . . . expression 1 where N is a product of a prime number p and a prime number q, the prime numbers p and q are larger than a predetermined value, and P is a product of all the prime numbers selected by the selecting unit.

With this arrangement, it is possible to obtain a modular exponentiation operation result that varies depending on the prime number selected by the selecting unit.

Especially, the modular exponentiation operation apparatus is effective for a system that takes the modular exponentiation operation result as a first key and generates a second key from the first key. When the modular exponentiation operation result is taken as the first key, and a modular exponentiation operation is further performed on the first key with all prime numbers that have been used in the modular exponentiation operation except for one prime number, the second key is obtained, which is a value obtained by performing a modular exponentiation operation on the operand stored in the storing unit with the inverse element of the excluded prime number; however, it is difficult, in terms of the amount of calculation required, to obtain the second key from a modular exponentiation operation result on which a modular exponentiation operation has not been performed with the inverse element of the excluded prime number. Thus, by using the second key for encryption and decryption, it is possible to control whether or not it is possible to generate the second key from the one result of the modular exponentiation operation depending on which prime number is selected as the excluded prime number.

Further, it is acceptable an arrangement wherein the selecting unit includes: a prime number storing subunit storing therein the $2^a-2$ prime numbers that are in one-to-one correspondence with all possible combinations in which as many branches as each of all numbers from 1 through (a−1) are selected from among a branches each connecting to one of nodes in an a-ary tree; and a branch obtaining subunit operable to obtain branch information specifying one branch out of the a branches; and a prime number selecting subunit operable to select all prime numbers being in correspondence with combinations that each include the branch specified in the branch information, from among the $2^a-2$ prime numbers stored in the prime number storing subunit.

With this arrangement, it is possible to select prime numbers that are in correspondence with all possible combinations that each include one of the branches connecting to one node in the a-ary tree, and to obtain a calculation result by performing a modular exponentiation operation with the inverse elements of the selected prime numbers.

Further, it is acceptable that the modular exponentiation apparatus further comprises: a writing unit operable to overwrite the operand S stored in the storing unit with the calculated value S' that now serves as the operand S; and a repetition control unit operable to control the branch obtaining subunit, the prime number selecting subunit, the calculating unit, and the writing unit so that, on each of branches positioned on a path from a root to a leaf in the a-ary tree, starting from the root and ending with the leaf, the obtainment of branch information specifying the branch, the selection of all prime numbers being in correspondence with combinations that each include the specified branch, the modular exponentiation operation based on the expression 1, and the writing of the calculated value S' into the storing unit are repeatedly performed.

With this arrangement, it is possible to obtain, for each of the leaves, a calculation result that is uniquely in correspondence with the path from the root to the leaf.

It is acceptable that the modular exponentiation operation apparatus further comprises: a reversible operation unit operable to perform a reversible operation on the calculated value S' to obtain a reversible operation result value; a writing unit operable to overwrite the operand S stored in the storing unit with the reversible operation result value that now serves as the operand S; and a repetition control unit operable to control the branch obtaining subunit, the prime number selecting subunit, the calculating unit, the reversible operation unit, and the writing unit so that, on each of branches positioned on a path from a root to a leaf in the a-ary tree, starting from the root and ending with the leaf, the obtainment of branch information specifying the branch, the selection of all prime numbers being in correspondence with combinations that each include the specified branch, the modular exponentiation operation based on the expression 1, the reversible operation on the calculated value S', and the writing of the reversible operation result value into the storing unit are repeatedly performed.

With this arrangement, by performing a reversible operation on a constant, it is possible to obtain a calculation result for which the calculation is divided for each of the hierarchical layers in the a-ary tree.

It is further acceptable to have an arrangement wherein the reversible operation unit obtains the reversible operation result value by adding a constant to the calculated value S'.

With this arrangement, by adding a constant, it is possible to obtain a calculation result for which the calculation is divided for each of the hierarchical layers in the a-ary tree.

The present invention provides a modular exponentiation operation apparatus comprising: a storing unit storing therein an operand T being a natural number; a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, where a is a natural number being two or larger; a valid prime number selecting unit operable to, while all branches positioned on a path from a root to a leaf in the a-ary tree are revoked, select a prime number being in correspondence with a combination that includes all unrevoked branches out of the a branches each connecting to the one of the nodes, from among the $2^a-2$ prime numbers stored in the prime number storing unit; and a calculating unit operable to perform a modular exponentiation operation over a finite field, the modular exponentiation operation being defined by $T^{1/P}$ mod N . . . expression 2 where N is a product of a prime number p and a prime number q, the prime numbers p and q are larger than a predetermined value, and P is the prime number selected by the valid prime number selecting unit.

With this arrangement, it is possible to obtain a calculation result related to the inverse element of a prime number being in correspondence with all valid (unrevoked) branches connecting to one of the nodes in the a-ary tree.

It is acceptable that the modular exponentiation operation apparatus further comprises: a memory unit storing therein an operand S being a natural number; a reading unit operable to read the operand S from the memory unit; a branch obtaining unit operable to obtain branch information specifying one branch out of the a branches; a prime number selecting unit operable to select all prime numbers being in correspondence with combinations that each include the branch specified in the branch information, from among the $2^a-2$ prime numbers stored in the prime number storing unit; a generating unit operable to perform a modular exponentiation operation over a finite field, the modular exponentiation operation seeking a value expressed by $S'=S^{1/Q}$ mod N ... expression 3 where N is the product of the prime number p and the prime number q, the prime numbers p and q are larger than the predetermined value, and Q is a product of all the prime numbers selected by the prime number selecting unit; a first writing unit operable to overwrite the operand S stored in the memory unit with the calculated value S' that now serves as the operand S; a repetition control unit operable to control the branch obtaining unit, the prime number selecting unit, the generating unit, and the first writing unit so that, on each of branches positioned on a path from a root to a node in the a-ary tree, starting from the root and ending with the node, the obtainment of branch information specifying the branch, the selection of all prime numbers being in correspondence with combinations that each include the specified branch, the modular exponentiation operation based on the expression 3, and the writing of the calculated value S' into the memory unit are repeatedly performed; a second writing unit operable to, after the repetition control unit finishes performing the control, write the calculated value S' that now serves as T into the storing unit; and a calculation control unit operable to control the valid prime number selecting unit and the calculating unit so as to select a prime number being in correspondence with a combination that includes all unrevoked branches and to perform the modular exponentiation operation based on the expression 2.

With this arrangement, it is possible to obtain, for each of the leaves, a calculation result that is uniquely in correspondence with the path from the root to the leaf.

The present invention also provides a calculation apparatus comprising: a prime number storing unit storing therein $2^a-2$ prime numbers that are in one-to-one correspondence with all possible combinations in which as many branches as each of all numbers from 1 through (a-1) are selected from among a branches each connecting to one of nodes in an a-ary tree, where a is a natural number being two or larger; a revoked branch selecting unit operable to, while all branches positioned on a path from a root to a leaf in the a-ary tree are revoked, select as many revoked branches as (a-1) or smaller, from among a branches connecting to a node; an unrevoked branch selecting unit operable to select an unrevoked branch from among the a branches connecting to the node; and a specification information distributing unit operable to distribute, to a playback apparatus, specification information that specifies, out of the prime numbers stored in the prime number storing unit, prime numbers being respectively in correspondence with all possible combinations that each include the selected unrevoked branch and at least one of the revoked branches.

With this arrangement, it is possible to generate and distribute key revocation information that enables only playback apparatuses being in correspondence with valid (unrevoked) branches to decrypt a content.

Further, it is acceptable to have an arrangement wherein the specification information distributing unit includes a communication subunit operable to distribute the specification information through communication.

With this arrangement, it is possible to distribute, to playback apparatuses through communication, the key revocation information that enables only playback apparatuses being in correspondence with valid (unrevoked) branches to decrypt a content.

It is also acceptable to have an arrangement wherein the specification information distributing unit includes a media writing subunit operable to write the specification information into a recording medium.

With this arrangement, it is possible to distribute, to playback apparatuses via recording media, the key revocation information that enables only playback apparatuses being in correspondence with valid (unrevoked) branches to decrypt a content.

The present invention provides a modular exponentiation operation apparatus comprising: a storing unit storing therein an operand S' being a natural number; a prime number storing unit storing therein $2^a-2$ prime numbers that are in one-to-one correspondence with all possible combinations in which as many branches as each of all numbers from 1 through (a-1) are selected from among a branches each connecting to one of nodes in an a-ary tree; an obtaining unit operable to obtain specification information that specifies one or more prime numbers out of the prime numbers stored in the prime number storing unit; and a calculating unit operable to perform a modular exponentiation operation over a finite field, the modular exponentiation operation being defined by $(S')^Q$ mod N ... expression 4 where N is a product of a prime number p and a prime number q, the prime numbers p and q are larger than a predetermined value, and Q is a product of all the prime numbers specified in the specification information.

With this arrangement, it is possible to obtain a modular exponentiation operation result with which the inverse element of a product of the specified one or more prime numbers is used.

Especially, the modular exponentiation operation apparatus is effective for a system that takes the modular exponentiation operation result as a first key and generates a second key from the first key. It is possible to obtain the second key by performing a modular exponentiation operation on the pre-stored first key with the predetermined prime numbers from which specified prime numbers are excluded; however, in the case where the pre-stored first key is a modular exponentiation operation result on which a modular exponentiation operation has not been performed with the inverse elements of the specified prime numbers, it is difficult, in terms of the amount of calculation required, to obtain the second key. Thus, it is possible to control whether or not it is possible to generate the second key depending on the first key and the specified prime numbers.

It is acceptable that the modular exponentiation operation apparatus further comprises: a storage unit storing therein an operand S being a natural number; a reading unit operable to read the operand S from the storage unit; a branch obtaining unit operable to obtain branch information that specifies one branch out of the a branches; a prime number selecting unit operable to select all prime numbers being in correspondence with combinations that each include the branch specified in the branch information, from among the $2^a-2$ prime numbers stored in the prime number storing unit; a generating unit operable to perform a modular exponentiation operation over a finite field, the modular exponentiation operation seeking a value expressed by $R=S^P \bmod N$ . . . expression 5 where N is the product of the prime number p and the prime number q, the prime numbers p and q are larger than the predetermined value, and P is a product of all the prime numbers selected by the prime number selecting unit; a first writing unit operable to overwrite the operand S stored in the memory unit with the calculated value R that now serves as the operand S; a repetition control unit operable to control the branch obtaining unit, the prime number selecting unit, the generating unit, and the first writing unit so that, on each of branches positioned on a path from a leaf to a node in the a-ary tree, starting from the leaf and ending with the node, the obtainment of branch information specifying the branch, the selection of all prime numbers being in correspondence with combinations that each include the specified branch, the modular exponentiation operation based on the expression 5, and the writing of the calculated value R into the memory unit are repeatedly performed; a second writing unit operable to, after the repetition control unit finishes performing the control, write the calculated value R that now serves as S' into the storing unit; and a calculation control unit operable to control the obtaining unit and the calculating unit so as to obtain the specification information and to perform the modular exponentiation operation based on the expression 4.

With this arrangement, it is possible to realize a modular exponentiation operation apparatus that performs a modular exponentiation operation corresponding to each hierarchical layer of the a-ary tree.

The present invention further provides a modular exponentiation operation apparatus that performs a calculation on the value S' calculated by the aforementioned modular exponentiation operation apparatus, comprising: a storing unit storing therein the calculated value S'; a selecting unit operable to select as many prime numbers as expressed by $$\sum_{m=1}^{a-1} {}_{a-1}C_{m-1}$$

where a is a natural number being 2 or larger and m is a variable natural number being any number from 1 through a-1, from among $2^a-2$ prime numbers that are mutually different; and a calculating unit operable to perform a modular exponentiation operation over a finite field, the modular exponentiation operation being defined by $(S')^Q \bmod N$ where N is a product of a prime number p and a prime number q, the prime numbers p and q are larger than a predetermined value, and Q is a product of all the prime numbers selected by the selecting unit.

With this arrangement, it is possible to generate an origin number from an operand generated by performing a modular exponentiation operation on the origin number with the inverse element of prime numbers.

The present invention provides a recording medium comprising a recording unit operable to record specification information distributed by the aforementioned modular exponentiation operation apparatus.

With this arrangement, it is possible to revoke playback apparatuses according to the recorded information.

The present invention provides a key management apparatus that manages a key used by a playback apparatus to decrypt a content the key management apparatus comprising the aforementioned modular exponentiation operation apparatus.

With this arrangement, it is possible to realize a key management apparatus that includes a modular exponentiation operation apparatus operable to generate a device key used for decryption of a content.

The present invention provides a key management apparatus that manages a key used by a playback apparatus to decrypt a content, the key management apparatus comprising the aforementioned modular exponentiation operation apparatus.

With this arrangement, it is possible to realize a key management apparatus that includes a modular exponentiation operation apparatus operable to generate a decryption key.

The present invention provides a key management apparatus that manages a key used by a playback apparatus to decrypt a content, the key management apparatus comprising the aforementioned modular exponentiation operation apparatus.

With this arrangement, it is possible to realize a key management apparatus that includes a modular exponentiation operation apparatus operable to generate key revocation data.

The present invention provides a playback apparatus that decrypts and plays back a content, the playback apparatus comprising the aforementioned modular exponentiation operation apparatus.

With this arrangement, it is possible to realize a playback apparatus that includes a modular exponentiation operation apparatus operable to generate a decryption key from a device key and that is operable to decrypt an encrypted content using the decryption key.

The present invention provides a recording apparatus that records a content, the recording apparatus comprising the aforementioned modular exponentiation operation apparatus.

With this arrangement, it is possible to realize a recording apparatus that includes a modular exponentiation operation apparatus operable to generate a decryption key from a device key and that is operable to encrypt a content with the decryption key.

The present invention provides a modular exponentiation operation method to be used by a modular exponentiation operation apparatus that includes a storing unit storing therein an operand S being a natural number, a reading unit, a selecting unit, and a calculating unit, the modular exponentiation operation method comprising: a reading step by the reading unit of reading the operand S from the storing unit; a selecting step by the selecting unit of selecting as many prime numbers as expressed by $$\sum_{m=1}^{a-1} {}_{a-1}C_{m-1}$$

where a is a natural number being 2 or larger and m is a variable natural number being any number from 1 through a-1, from among $2^a-2$ prime numbers that are mutually different; and a calculating step by the calculating unit of performing a modular exponentiation operation over a finite field, the modular exponentiation operation seeking a value expressed by $S'=S^{1/P} \bmod N$ . . . expression 1 where N is a product of a prime number p and a prime number q, the prime numbers p and q are larger than a predetermined value, and P is a product of all the prime numbers selected by the selecting unit.

With this arrangement, it is possible to obtain a modular exponentiation operation result that varies depending on the prime number selected by the selecting unit.

Especially, the modular exponentiation operation apparatus is effective for a system that takes the modular exponentiation operation result as a first key and generates a second key from the first key. When the modular exponentiation operation result is taken as the first key, and a modular exponentiation operation is further performed on the first key with all prime numbers that have been used in the modular exponentiation operation except for one prime number, the second key is obtained, which is a value obtained by performing a modular exponentiation operation on the operand stored in the storing unit with the inverse element of the excluded prime number; however, it is difficult, in terms of the amount of calculation required, to obtain the second key from a modular exponentiation operation result on which a modular exponentiation operation has not been performed with the inverse element of the excluded prime number. Thus, by using the second key for encryption and decryption, it is possible to control whether or not it is possible to generate the second key from the one result of the modular exponentiation operation depending on which prime number is selected as the excluded prime number.

The present invention provides a modular exponentiation operation method to be used by a modular exponentiation operation apparatus that includes a storing unit storing therein an operand T being a natural number and a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, where a is a natural number being two or larger, a valid prime number selecting unit, and a calculating unit, the modular exponentiation operation method comprising: a valid prime number selecting step by the valid prime number selecting unit of, while all branches positioned on a path from a root to a leaf in the a-ary tree are revoked, selecting a prime number being in correspondence with a combination that includes all unrevoked branches out of the a branches each connecting to one of the nodes, from among the $2^a-2$ prime numbers stored in the prime number storing unit; and a calculating step by the calculating unit of performing a modular exponentiation operation over a finite field, the modular exponentiation operation being defined by $T^{1/P} \bmod N$ . . . expression 2 where N is a product of a prime number p and a prime number q, the prime numbers p and q are larger than a predetermined value, and P is the prime number selected by the valid prime number selecting unit.

With this arrangement, it is possible to obtain a calculation result related to the inverse element of a prime number being in correspondence with all valid (unrevoked) branches connecting to one of the nodes in the a-ary tree.

The present invention provides a calculation method to be used by a calculating apparatus including a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, where a is a natural number being two or larger, an unrevoked branch selecting unit, a revoked branch selecting unit, and specification information distributing unit, the calculation method comprising: a revoked branch selecting step by the revoked branch selecting unit of, while all branches positioned on a path from a root to a leaf in the a-ary tree are revoked, selecting as many revoked branches as (a−1) or smaller, from among a branches connecting to a node; an unrevoked branch selecting step by the unrevoked branch selecting unit of selecting an unrevoked branch from among the a branches connecting to the node; and a specification information distributing step by the specification information distributing unit of distributing, to a playback apparatus, specification information that specifies, out of the prime numbers stored in the prime number storing unit, prime numbers being respectively in correspondence with all possible combinations that each include the selected unrevoked branch and at least one of the revoked branches.

With this arrangement, it is possible to generate and distribute key revocation information that enables only playback apparatuses being in correspondence with valid (unrevoked) branches to decrypt a content.

The present invention provides a modular exponentiation operation method to be used by a modular exponentiation operation apparatus that includes a storing unit storing therein an operand S' being a natural number, a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, an obtaining unit, and a calculating unit, the modular exponentiation operation method comprising: an obtaining step by the obtaining unit of obtaining specification information that specifies one or more prime numbers out of the prime numbers stored in the prime number storing unit; and a calculating step by the calculating unit of performing a modular exponentiation operation over a finite field, the modular exponentiation operation being defined by $(S')^Q \bmod N$ . . . expression 4 where N is a product of a prime number p and a prime number q, the prime numbers p and q are larger than a predetermined value, and Q is a product of all the prime numbers specified in the specification information.

With this arrangement, it is possible to obtain a modular exponentiation operation result with which the inverse element of a product of the specified one or more prime numbers is used.

The present invention provides a modular exponentiation operation method to be used by a modular exponentiation operation apparatus that performs a calculation on the value S' calculated by the aforementioned modular exponentiation operation apparatus and includes a storing unit storing therein the calculated value S', a selecting unit, and a calculating unit, the modular exponentiation operation method comprising: a selecting step by the selecting unit of selecting as many prime numbers as expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; and a calculating step by the calculating unit of performing a modular exponentiation operation over a finite field, the modular exponentiation operation being defined by $(S')^Q \bmod N$ where N is a product of a prime number p and a prime number q, the prime numbers p and q are larger than a predetermined value, and Q is a product of all the prime numbers selected by the selecting unit.

With this arrangement, it is possible to generate an origin number from an operand generated by performing a modular exponentiation operation on the origin number with the inverse element of prime numbers.

The present invention provides a program to be applied to a modular exponentiation operation apparatus that includes a storing unit storing therein an operand S being a natural number, a reading unit, a selecting unit, and a calculating unit, the program having a computer execute: a reading step by the reading unit of reading the operand S from the storing unit; a selecting step by the selecting unit of selecting as many prime numbers as expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; and a calculating step by the calculating unit of performing a modular exponentiation operation over a finite field, the modular exponentiation operation seeking a value expressed by $S'=S^{1/P}$ mod N . . . expression 1 where N is a product of a prime number p and a prime number q, the prime numbers p and q are larger than a predetermined value, and P is a product of all the prime numbers selected by the selecting unit.

With this arrangement, it is possible to obtain a modular exponentiation operation result that varies depending on the prime number selected by the selecting unit.

Especially, the modular exponentiation operation apparatus is effective for a system that takes the modular exponentiation operation result as a first key and generates a second key from the first key. When the modular exponentiation operation result is taken as the first key, and a modular exponentiation operation is further performed on the first key with all prime numbers that have been used in the modular exponentiation operation except for one prime number, the second key is obtained, which is a value obtained by performing a modular exponentiation operation on the operand stored in the storing unit with the inverse element of the excluded prime number; however, it is difficult, in terms of the amount of calculation required, to obtain the second key from a modular exponentiation operation result on which a modular exponentiation operation has not been performed with the inverse element of the excluded prime number. Thus, by using the second key for encryption and decryption, it is possible to control whether or not it is possible to generate the second key from the one result of the modular exponentiation operation depending on which prime number is selected as the excluded prime number.

The present invention provides a program to be applied to a modular exponentiation operation apparatus that includes a storing unit storing therein an operand T being a natural number, and a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, where a is a natural number being two or larger, a valid prime number selecting unit, and a calculating unit, the program having a computer execute: a valid prime number selecting step by the valid prime number selecting unit of, while all branches positioned on a path from a root to a leaf in the a-ary tree are revoked, selecting a prime number being in correspondence with a combination that includes all unrevoked branches out of the a branches each connecting to the one of the nodes, from among the $2^a-2$ prime numbers stored in the prime number storing unit; and a calculating step by the calculating unit of performing a modular exponentiation operation over a finite field, the modular exponentiation operation being defined by $T^{1/P}$ mod N . . . expression 2 where N is a product of a prime number p and a prime number q, the prime numbers p and q are larger than a predetermined value, and P is the prime number selected by the valid prime number selecting unit.

With this arrangement, it is possible to obtain a calculation result related to the inverse element of a prime number being in correspondence with all valid (unrevoked) branches connecting to one of the nodes in the a-ary tree.

The present invention provides a program to be applied to a calculating apparatus including a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, where a is a natural number being two or larger, a revoked branch selecting unit, an unrevoked branch selecting unit, and specification information distributing unit, the program having a computer execute: a revoked branch selecting step by the revoked branch selecting unit of, while all branches positioned on a path from a root to a leaf in the a-ary tree are revoked, selecting as many revoked branches as (a−1) or smaller, from among a branches connecting to a node; an unrevoked branch selecting step by the unrevoked branch selecting unit of selecting an unrevoked branch from among the a branches connecting to the node; and a specification information distributing step by the specification information distributing unit of distributing, to a playback apparatus, specification information that specifies, out of the prime numbers stored in the prime number storing unit, prime numbers being respectively in correspondence with all possible combinations that each include the selected unrevoked branch and at least one of the revoked branches.

With this arrangement, it is possible to generate and distribute key revocation information that enables only playback apparatuses being in correspondence with valid (unrevoked) branches to decrypt a content.

The present invention provides a program to be applied to a modular exponentiation operation apparatus that includes a storing unit storing therein an operand S' being a natural number, a prime number storing unit storing therein $2^a-2$ prime numbers that are in one-to-one correspondence with all possible combinations in which as many branches as each of all numbers from 1 through (a−1) are selected from among a branches each connecting to one of nodes in an a-ary tree, an obtaining unit, and a calculating unit, the program having a computer execute: an obtaining step by the obtaining unit of obtaining specification information that specifies one or more prime numbers out of the prime numbers stored in the prime number storing unit; and a calculating step by the calculating unit of performing a modular exponentiation operation over a finite field, the modular exponentiation operation being defined by $(S')^Q$ mod N . . . expression 4 where N is a product of a prime number p and a prime number q, the prime numbers p and q are larger than a predetermined value, and Q is a product of all the prime numbers specified in the specification information.

With this arrangement, it is possible to obtain a modular exponentiation operation result with which the inverse element of a product of the specified one or more prime numbers is used.

The present invention provides a program to be applied to a modular exponentiation operation apparatus that performs a calculation on the value S' calculated by the aforementioned modular exponentiation operation apparatus and includes a storing unit storing therein the calculated value S', a selecting unit, and a calculating unit, the program having a computer execute: a selecting step by the selecting step of selecting as many prime numbers as expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; and a calculating step by the calculating unit of performing a modular exponentiation operation over a finite field, the modular exponentiation operation being defined by $(S')^Q$ mod N where N is a product of a prime number p and a prime number q, the prime numbers p and q are larger than a predetermined value, and Q is a product of all the prime numbers selected by the selecting unit.

With this arrangement, it is possible to generate an origin number from an operand generated by performing a modular exponentiation operation on the origin number with the inverse element of prime numbers.

BRIEF DESCRIPTION OF THE DRAWINGS

FIG. 1 schematically shows the configuration of the copyright protection system of the present invention;

FIG. 2 is a flow chart that shows the operation of the copyright protection system of the present invention as a whole;

FIG. 3 shows a tree structure with ternary trees for managing twenty-seven apparatuses;

FIG. 4 is a block diagram that shows the configuration of a key management apparatus of the present invention;

FIG. 5 shows a prime number table generated and stored by the prime number assigning unit;

FIG. 6 is a flow chart that shows the processing performed by the prime number assigning unit to generate a prime number table for an a-ary tree;

FIG. 9 shows a revocation table that is stored by the revoked apparatus identifying unit and is based on revoked apparatus identification information and a tree structure;

FIG. 11 shows the data structure of a piece of key revocation data recorded on a recording medium;

DETAILED DESCRIPTION OF THE INVENTION

Figure 7:
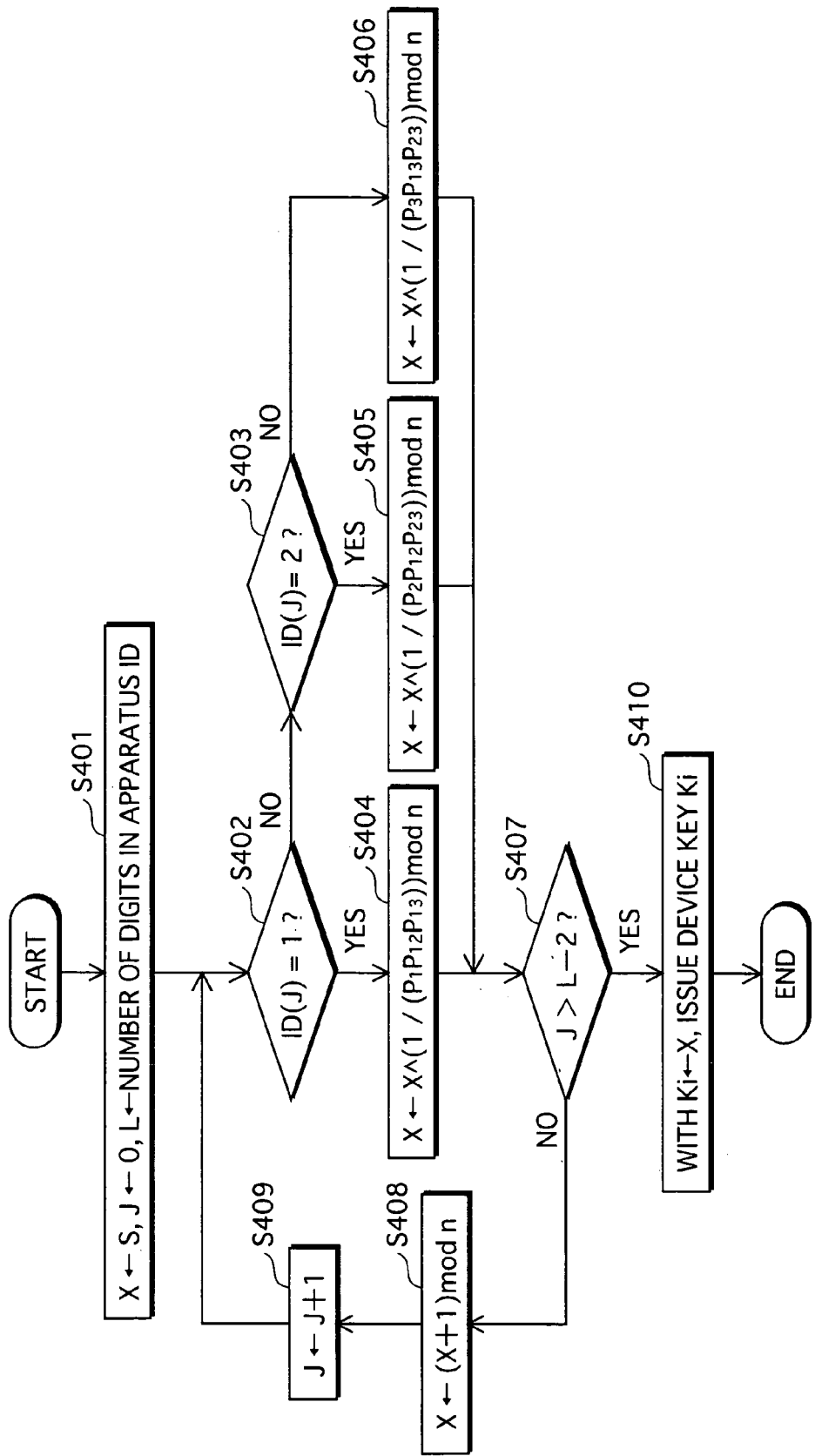
FIG. 7 is a flow chart that shows the processing performed by the device key generating unit to generate a device key based on a tree structure with ternary trees.

The following describes an embodiment of the present invention with reference to the drawings.

The present invention provides a system that protects the copyright of a content by preventing an illegitimate apparatus from playing back in a normal manner the content whose copyright should be protected, the illegitimate apparatus being unable to protect the copyright of the content due to, for example, disclosure of the key.

The following describes the outline of the configuration of the copyright protection system, which is an embodiment of the present invention.

FIG. 1 is a schematic drawing of the configuration of the copyright protection system.

As shown in FIG. 1, the copyright protection system comprises a key management apparatus 100, a recording apparatus 110, a recording medium 120, and playback apparatuses 130, 130a, . . . 130b.

The key management apparatus 100 is operated by a company that sells and manages the playback apparatuses 130, 130a, . . . 130b. Being a server connected to a network, the key management apparatus 100 generates device keys each of which is uniquely in correspondence with a different one of the playback apparatuses, and transmits each device key to the corresponding playback apparatus, and also transmits all the device keys that have been generated to the recording apparatus 110.

The company also manufactures a recording medium 120 for recording a content. The key management apparatus 100 records key revocation data onto the recording medium 120, the key revocation data being data for preventing a specific playback apparatus among those playback apparatuses that has become unable to protect the copyright due to disclosure of the device key or the like, from decrypting a content that has been encrypted for protection of the copyright. When an encrypted content is recorded onto the recording medium 120 on which the key revocation data has been recorded, the specific playback apparatus is not able to decrypt the encrypted content.

The recording apparatus 110 encrypts the content whose copyright needs to be protected and records the encrypted content onto the recording medium 120 on which various kinds of information, including the key revocation data, have been recorded by the key management apparatus 100.

When the recording medium 120 is inserted, each of the playback apparatuses 130, 130a, . . . , 130b performs predetermined processing using the information recorded on the recording medium 120 and a device key stored in the respective playback apparatus. When each playback apparatus has successfully decrypted the key used for the decryption of the content as a result of the predetermined processing, each playback apparatus decrypts the content using the obtained key and plays back the content.

In the present embodiment, the recording apparatus and the playback apparatus are configured separately; however, it is acceptable to use a recording and playback apparatus that has both the recording function of the recording apparatus and the playback function of the playback apparatus and is operable to record and play back contents.

In order to encrypt and decrypt information in the copyright protection system, four kinds of keys are used, such as device keys, encryption keys (and decryption keys identical to the encryption keys), media keys, and content keys.

As mentioned before, each of the device keys is uniquely in correspondence with a different one of the playback apparatuses and the recording apparatus and is generated by the key management apparatus 100 and distributed to the corresponding one of the playback apparatuses and the recording apparatus.

As noted before, a decryption key is identical to an encryption key and is used for encrypting a media key and decrypting the encrypted media key. A decryption key is generated by the key management apparatus 100. Valid (unrevoked) playback apparatuses and the recording apparatus are each able to generate a decryption key by performing predetermined processing using a piece of key revocation data and a device key.

A media key is used for encrypting and decrypting a content key. The media key is stored in the key management apparatus 100 and is to be encrypted by the key management apparatus 100 using the decryption key and to be recorded onto the recording medium 120.

A content key is used for encrypting and decrypting a content. The content key is stored in the recording apparatus 110, and is to be encrypted by the recording apparatus 110 using the media key and to be recorded onto the recording medium 120.

The following describes the operation of the copyright protection system as a whole.

FIG. 2 is a flow chart that shows the operation of the copyright protection system as a whole.

In FIG. 2, Steps S101 through S107 show the processing performed by the key management system 100. Steps S108 through S111 show the processing performed by the recording apparatus 110, and Steps S112 through S117 show the processing performed by the playback apparatus 130.

The key management apparatus 100 generates a prime number table (S101).

The prime number table shows prime numbers that are used by the key management apparatus 100 to generate device keys.

The key management apparatus 100 generates the device keys corresponding to the playback apparatuses, using the prime number table (S102), and distributes each of the device keys to a corresponding one of the playback apparatus and the recording apparatus (S103).

The key management apparatus 100 generates one or more decryption keys (S104), and further generates a piece of key revocation data (S105).

The piece of key revocation data includes information for allowing only each of unrevoked playback apparatuses to generate a decryption key. The number of decryption keys generated in S104 varies depending on the number of revoked playback apparatuses.

The key management apparatus 100 encrypts the media key with each of encryption keys identical to the decryption keys generated in S104 (S106), and writes the piece of key revocation data including the encrypted media key onto the recording medium 120 (S107).

The recording apparatus 110 generates a decryption key using the device key received from the key management apparatus 100 and the piece of key revocation data recorded on the recording medium 120 (S108).

The recording apparatus 110 extracts the encrypted media key from the piece of key revocation data and decrypts the encrypted media key with the decryption key generated in S108, so as to obtain the media key (S109).

The recording apparatus 110 stores therein a content and a content key, and encrypts the content using the content key and records the encrypted content onto the recording medium 120 (S110), and also encrypts the content key using the media key generated in S109 and records the encrypted content key onto the recording medium 120 (S111).

The playback apparatus 130 attempts to generate a decryption key, using the piece of key revocation data read from the recording medium 120 (S112). If the playback apparatus 130 has not been revoked, the playback apparatus 130 is able to successfully generate the decryption key.

The playback apparatus 130 judges whether the decryption key has successfully been generated or not (S113), and when the decryption key has not successfully been generated (S113: No), the processing is finished.

When the decryption key has successfully been generated (S113: Yes), the playback apparatus 130 decrypts the encrypted media key recorded on the recording medium 120 using the generated decryption key (S114).

The playback apparatus 130 further decrypts the encrypted content key recorded on the recording medium 120, using the media key decrypted in S114 (S115).

The playback apparatus 130 decrypts the encrypted content recorded on the recording medium 120, using the content key generated in S115 (S116), and plays back the content (S117).

Next, the following describes in detail the apparatuses that are included in the copyright protection system.

<The Key Management Apparatus 100>

The key management apparatus 100 generates device keys each of which is uniquely in correspondence with a different one of the playback apparatuses and the recording apparatus, distributes each of the generated device keys to a corresponding one of the playback apparatus and the recording apparatus, generates a piece of key revocation data, and records the piece of key revocation data onto the recording medium.

The key management apparatus 100 manages a group of playback apparatuses including the playback apparatuses 130, 130a, . . . 130b, and the recording apparatus, using a tree structure. In the present embodiment, the total number of playback apparatuses and recording apparatuses managed by the key management apparatus 100 is twenty-seven, and the tree structure is of ternary trees.

At first, explanation is provided on the tree structure.

FIG. 3 shows the tree structure with ternary trees for managing the twenty-seven apparatuses.

$N_0$~$N_{333}$ in FIG. 3 denote nodes. The numbers 1, 2, 3, . . . (hereafter, referred to as path numbers) are provided, starting from the left, for the lines (hereafter, simply referred to as paths) that connect the nodes, as shown in the drawing.

For each node, a node ID is provided indicating the path tracing from the root node $N_0$ to that particular node in the tree structure.

In FIG. 3, $N_{abc}$ denotes a node whose node ID is "abc", and it means that the path is routed from the root node $N_0$ to $N_{abc}$, through a path whose path number is a, and a path whose path number is b, and then a path whose path number is c, in the stated order.

The tree structure has four logical hierarchical layers such as the layers, 0, 1, 2, and 3, with the layer 0 being the uppermost layer. When a node ID is an L-digit number, it means that the node belongs to the layer L.

For example, as shown in FIG. 3, $N_1$ belongs to the layer 1, and $N_{11}$ belongs to the layer 2. $N_0$ is a special node being the root and belongs to the layer 0.

The nodes $N_{111}$~$N_{333}$ that belong to the layer 3, which is the lowermost layer of the tree structure, are in correspondence with apparatuses such as the playback apparatuses 130, 130a, . . . 130b and the recording apparatus 110 which have apparatus IDs being the same values as the node IDs.

The twenty-seven apparatuses that are in correspondence with the nodes in the layer 3 will be referred to as the apparatuses 1 through 27 as shown in FIG. 3. The device keys K1 through K27 are to be distributed to the apparatuses 1 through 27, respectively. For example, the key management apparatus 100 distributes a device key, K2 to the apparatus 2 whose apparatus ID is "112", and distributes another device key K20 to the apparatus 20 whose apparatus ID is "312".

Next, the following describes the configuration of the key management apparatus 100 in detail.

FIG. 4 is a block diagram showing the configuration of the key management apparatus 100.

As shown in FIG. 4, the key management apparatus 100 comprises: a prime number assigning unit 201; a random number generating unit 202; a key information storing unit 203; a device key generating unit 204; a revoked apparatus identifying unit 205; a key revocation data generating unit 206; a transmitting unit 207; and a writing unit 208, and is a computer system that includes, as hardware, a CPU (Central Processing Unit), a ROM (Read-only Memory), a RAM (Random Access Memory), a hard disk, a keyboard, a network adapter, and the like. A computer program is stored in the ROM or the hard disk. The key management apparatus 100 realizes its functions as the CPU operates according to the computer program.

The prime number assigning unit 201 pre-stores therein prime numbers p and q that are used for calculating n, which is a modulus in the RSA encryption and is required for generation of device keys, and has the key information storing unit 203 store the prime numbers p and q.

The RSA encryption is an encryption method in which public keys being prime numbers and decryption keys being the inverse elements of the public keys are used, under a modulus being a composite number n, which is a product of the prime numbers p and q. The characteristic of this encryption method is that when the prime numbers p and q are unknown, it is difficult to calculate, in terms of the amount of calculation required, the inverse elements of the prime numbers.

The following shows an example for each of p, q, and n:
p=FFFFFFFF EA2DE66E D3B1B7E9 61B75DFC D9FAE2FF A07A2345 9B7956FB 1B9B16D7 E1B6D59B BDF45B85 3CBF08EA 3BC7A1BD 541CB3A8 80E02E43 87CA7DEF 50948E87, q=FFFFFFFF E275B7F4 98A3811D E906ACF7 BFEB5CD6 A445AF09 D7906DE1 97CC2CCD 87614718 8C7C084F CE9231CA B7CFA113 13C3DDCF F1B70A54 84494467 8FCEF193, n=pq=FFFFFFFF CCA39E63 6ED9CF52 950C23A0 38AE0291 012B984A 964FFBBD 99E9DACB 91400431 0C5DD264 B1873126 44A725C5 D5BC73F4 97CFD100 89FD1342 656026BE 3FB583FE B134FF43 6957A1E1 D975B5BE DF1A9570 4C81A337 F06E5F9F 9388A7AC 5ABFD5CF 0356D91A 9861C69F E50509C2 323E5270 F2015FBD C08AA2C0 391CEE85. It should be noted that p, q, and n are expressed in the hexadecimal number system.

The RSA encryption is explained in detail in "*Ango Riron Nyumon*" (written by Eiji OKAMOTO, published by Kyoritsu Shuppan Co., Ltd.). Detailed explanation will be therefore omitted.

The prime number assigning unit 201 has the key information storing unit 203 store m pieces of prime numbers that are required for generation of the device keys.

The value of m depends on the tree structure. When the tree structure is with a-ary trees, $m=2^a-2$. For example, with the example shown in FIG. 3, since the tree structure is with ternary trees, $m=2^3-2=6$.

The value m is equal to the number of all possible combinations of the path numbers "1", "2", . . . "a" to be selected from, except for a combination in which all the path numbers are selected. In other words, $$m = {}_aC_1 + {}_aC_2 + \ldots + {}_aC_{(a-1)}$$

For example, in the case with ternary trees, there are six possible combinations of the three path numbers "1", "2", and "3" to be selected from, excluding the combination in which all the path numbers are selected. The six combinations are as follows: (1) select only "1", (2) select only "2", (3) select only "3", (4) select "1" and "2", (5) select "1" and "3", and (6) select "2" and "3".

The prime number assigning unit 201 pre-stores therein m or more pieces of prime numbers and assigns a different one of mutually distinctive prime numbers to each of the m combinations. The prime numbers corresponding to the combinations are each called a generated prime number and hereafter will be expressed as $P_x$. For the "x" in "$P_x$", one or more selected path numbers are joined together, and will be referred to as the "selected path number".

For example, the selected path number in the case of "(1) select only 1" is "1", and the prime number in this case is $P_1$. The selected path number in the case of "(4) select 1 and 2" is "12" and the prime number in this case is $P_{12}$.

The following describes generation of the prime number table performed by the prime number assigning unit 201.

FIGS. 5A and 5B each show a prime number table generated and stored by the prime number assigning unit 201. FIG. 5A is for a case where the tree structure is with ternary trees. FIG. 5B is for a case where the tree structure is with four-ary trees. In FIGS. 5A and 5B, each line of the prime number table shows a set of a selected path number and a generated prime number.

For example, in FIG. 5A, the fourth line of the prime number table corresponds to the combination of the path numbers "1" and "2" in the case (4), and indicates that the selected path number is 12 and the generated prime number is $P_{12}$.

FIG. 6 is a flow chart that shows the processing for generating a prime number table for a-ary trees, performed by the prime number assigning unit 201, and corresponds to S101 in FIG. 2.

The prime number assigning unit 201 initializes the variables k and l to be used in the operation (S201).

The initial value 1 is assigned to k. The initial value k−1 is assigned to l.

The prime number assigning unit 201 initializes the storage areas P(0) to P(a−1) for storing the path numbers used in the operation, so that "P(x)=(x+1)" is satisfied, where 0≦x≦(k−1) (S202).

For example, P(0)=1, P(1)=2, . . . P(k−1)=k

Further, the prime number assigning unit 201 initializes the pointer indicating a write destination on the prime number table so that the pointer points to the first line of the prime number table (S203).

A number in which P(0) to P(k−1) are joined together is written to the write destination to which the pointer points as a "selected path number" (S204).

A prime number is generated and written to the write destination to which the pointer points as a "generated prime number" (S205).

It is judged whether P(k−1)+1 is larger than a or not (S206).

When the judgment result is that P(k−1)+1 is smaller than or equal to a (S206: No), P(k−1) is incremented. (S207)

The pointer is updated so that it points to a next area (S208).

When the judgment result is that P(k−1)+1 is larger than a (S206: Yes), it is judged whether l−1 is larger than zero or not (S209).

When the judgment result is that l−1 is larger than or equal to zero (S209: Yes), it is judged whether P(l−k)+k is larger than a or not (S210).

When the judgment result is that P(l−k)+k is smaller than or equal to a (S210: No), l is decremented (S211).

After the value stored in P(l) is incremented, the processing expressed by "P(l+x)=P(l)+x" (where 1≦x≦(k−1−l)) is performed, and the procedure advances to S208 (S212).

When the judgment result is that l−1 is smaller than zero (S209: No), or when the judgment result in S210 is that P(l−k)+k is smaller than a (S210: Yes), it is judged whether (k+1) is larger than (a−1) or not (S213).

When the judgment result in S213 is that (k+1) is smaller than (a−1) (S213: NO), the processing is finished.

When the judgment result in S213 is that (k+1) is larger than (a−1) (S213: YES), k is incremented, and (k−1) is assigned to l (S214).

It is arranged so that P(0)=1, P(1)=2, . . . P(k−1)=k (S215).

As a result of S201 to S215 as explained above, the prime number assigning unit 201 generates and stores therein a prime number table shown in FIG. 5.

The random number generating unit 202 generates a random number, i.e. the random number S, which is required for generation of device keys, and stores the random number into the key information storing unit 203.

The key information storing unit 203 stores therein the prime number generated by the prime number assigning unit 201 and the random number generated by the random number generating unit 202.

The key information storing unit 203 also pre-stores therein media keys each of which is unique to a different one of recording media including the recording medium 120.

The device key generating unit 204 generates device keys corresponding to the apparatuses 1 through 27, respectively, based on the information stored in the key information storing unit 203.

FIG. 7 is a flow chart that shows the processing of generating device keys based on a tree structure with ternary trees, performed by the device key generating unit 204. The processing corresponds to S102 shown in FIG. 2.

In FIG. 7, "ID(J)" denotes a J'th path number counted from the lowermost digit in the apparatus ID of an apparatus that issues the device key. For example, in the case of the apparatus 20 whose apparatus ID is "312", ID(1)=2, ID(2)=1, and ID(3)=3 are obtained.

It should be noted that in each exponentiation calculation mentioned hereafter, it means, without any additional notice, that a "mod n" calculation is performed under the modulus n.

The device key generating unit 204 initializes each of the variables used in the operation (S401).

The random number S stored in the key information storing unit 203 is assigned to the variable X. A zero is assigned to the variable J. The number of digits in the apparatus ID is assigned to the variable L.

In the example of the tree structure shown in FIG. 3, L=3.

It is judged whether the value of ID(J) is 1 or not (S402). When the value is 1, the procedure advances to S404. When the value is not 1, the procedure advances to S403.

Then, it is judged whether the value of ID(J) is 2 or not (S403). When the value is 2, the procedure advances to S405. When the value is not 2, the procedure advances to S406.

It should be noted that the steps S402 and S403 are steps for selecting modular exponentiation operations to be executed for the cases where ID(J) is 1, 2, and 3, in correspondence with the ternary tree. In the case of an a-ary tree, it is necessary to select a modular exponentiation operation to be executed for each of the cases where ID(J) is 1, 2, . . . (a−1), and a; therefore, it is necessary to perform as many judgment steps that are equivalent to Step S402 (or S403) as "a−1".

For the variable X, a modular exponentiation operation is performed on the inverse elements of the prime numbers $P_1$, $P_{12}$, and $P_{13}$, so that the result is assigned to the variable X (S404).

The prime numbers whose inverse elements are used in the modular exponentiation operation in Step S404 are all the prime numbers that correspond to ID(J)=1 and contain the value "1" in the selected path number in the prime number table.

In a case of a ternary tree, among the prime numbers shown in FIG. 5A, the prime numbers $P_1$, $P_{12}$, and $P_{13}$ which each contain the value "1" in the corresponding selected path number are used in the calculation of S404.

In a case of a four-ary tree, the prime numbers $P_1$, $P_{12}$, $P_{13}$, $P_{14}$, $P_{123}$, $P_{124}$, and $P_{134}$ each contain the value "1" in the selected path number shown in FIG. 5B are used.

It should be noted that the inverse element of a prime number $P_x$ is expressed as $1/P_x$.

For the variable X, a modular exponentiation operation is performed on the inverse elements of the prime numbers $P_2$, $P_{12}$, and $P_{23}$, so that the result is assigned to the variable X (S405).

The prime numbers whose inverse elements are used in the modular exponentiation operation in Step S405 are all the prime numbers that correspond to ID(J)=2 and contain the value "2" in the selected path number in the prime number table.

For the variable X, a modular exponentiation operation is performed on the inverse elements of the prime numbers $P_3$, $P_{13}$, and $P_{23}$, so that the result is assigned to the variable X (S406).

The prime numbers whose inverse elements are used in the modular exponentiation operation in Step S406 are all the prime numbers that correspond to ID(J)=3 and contain the value "3" in the selected path number in the prime number table.

It should be noted that the steps S404, S405, and S406 are steps for performing modular exponentiation operations to be executed for the cases where ID(J) is 1, 2, and 3, in correspondence with the ternary tree. In the case of an a-ary tree, a modular exponentiation operation step is required for each of the cases in which ID(J) is 1, 2, . . . (a−1), and a. In other words, it is necessary to perform as many modular exponentiation operations equivalent to S404 (or S405, S406) as "a". The prime numbers whose inverse elements are used in the modular exponentiation operations are all the prime numbers that correspond to ID(J)=h (where 1≦h≦a) and contain the value "h" in the selected path number in the prime number table.

Then, it is judged if the variable J is larger than the variable L−2 (S407). When the judgment result is that the variable J is larger than the variable L−2, the procedure advances to S410.

When the judgment result is that the variable J is no larger than the variable L−2, the procedure advances to S408.

1 is added to the variable X, and the result is assigned to the variable X (S408).

1 is added to the variable J, and the result is assigned to the variable J (S409).

The calculated value of the variable X is assigned to Ki, and the device key Ki is issued for the apparatus i (S410).

The processing above shown in the flow chart in FIG. 7 is repeated as many times as the number of apparatuses for each of which a device key needs to be generated.

Here, the following describes an example in which a device key for the apparatus 20 is calculated, according to the flow chart shown in FIG. 7: First, $S\char`\^\{1/(P_3P_{13}P_{23})\}$ is calculated in Step S406, and then, 1 is added in S408. Next, for the result of addition, which is X, $X\char`\^\{1/(P_1P_{12}P_{13})\}$ is calculated in S404, and again 1 is added in S408. Finally, for the result of addition, which is X, $X\char`\^\{1/(P_2P_{12}P_{23})\}$ is calculated in S405.

As a result of the processing above, the device key K20 issued for the apparatus 20 is expressed as follows:

$$K20=((S\char`\^(1/(P_3P_{13}P_{23}))+1)\char`\^(1/(P_1P_{12}P_{13}))+1)\char`\^(1/(P_2P_{12}P_{23}))$$

Likewise, the device key K2 issued for the apparatus 2 can be expressed as follows:

$$K2=((S\char`\^(1/(P_1P_{12}P_{13}))+1)\char`\^(1/(P_1P_{12}P_{13}))+1)\char`\^(1/(P_2P_{12}P_{23}))$$

The revoked apparatus identifying unit 205 stores therein revoked apparatus identification information that shows one or more apparatuses that should be revoked and has been inputted by, for example, an operator using a keyboard (not shown in the drawing) included in the key management apparatus 100.

In the present embodiment, it is assumed that device keys K1 through K27 are distributed to the apparatuses 1 through 27 respectively, and then the device keys K1 and K26 corresponding to the apparatuses 1 and 26 are disclosed. The key management apparatus 100 generates pieces of key revocation data so that it is impossible to decrypt a content using K1 or K26.

Figure 8:
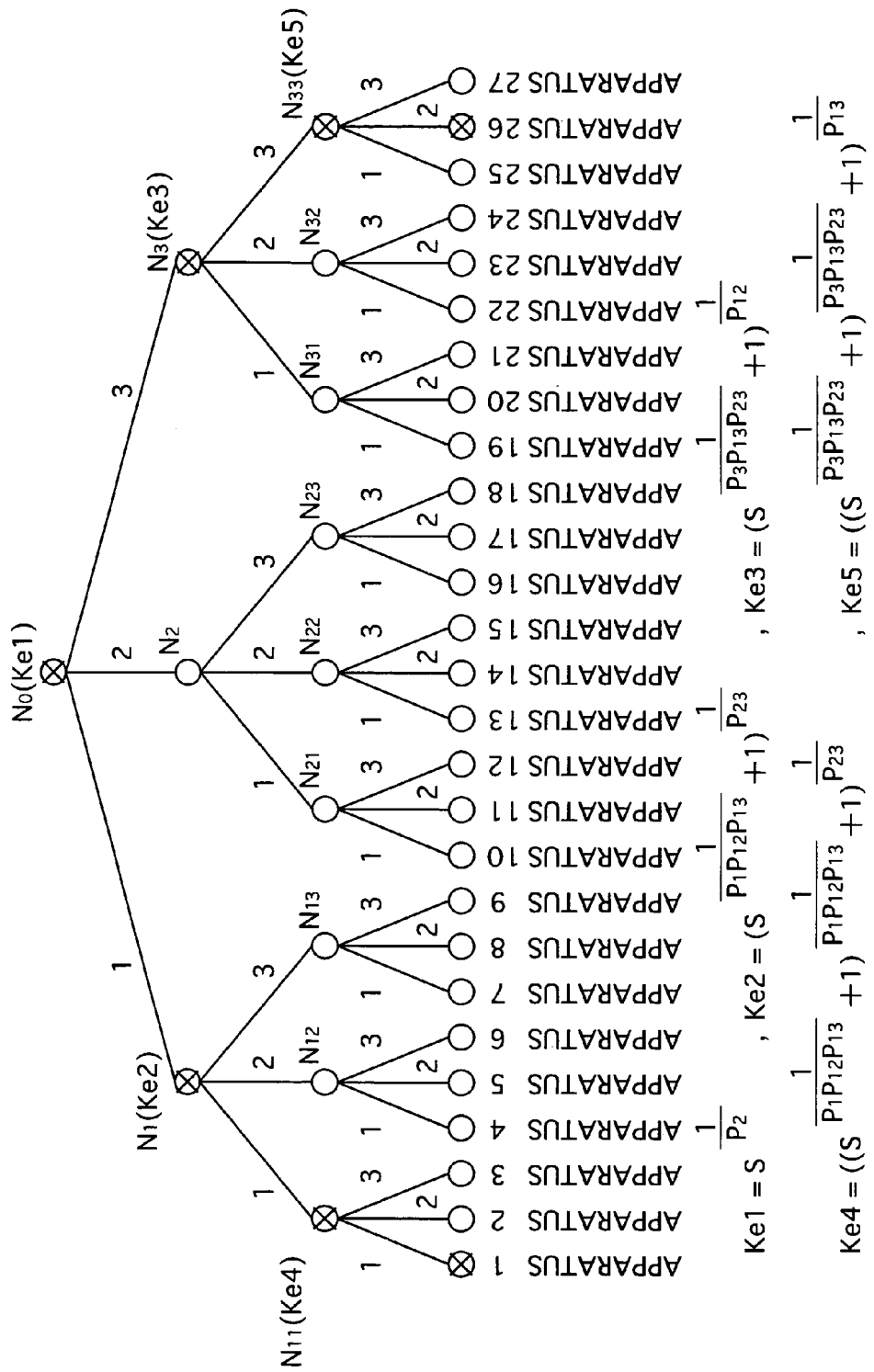
FIG. 8 shows, in a typified manner, the relationship between nodes that output encryption keys and the values of the encryption keys in the tree structure in the case where apparatuses are revoked.

FIG. 8 schematically shows the relationship, in the aforementioned tree structure, between the nodes that output encryption keys and the values of the encryption keys in a case where the apparatus 1 and the apparatus 26 are revoked.

When the apparatus n is revoked, an encryption key is generated for each of the nodes positioned on the path from a node corresponding to the apparatus n to $N_0$ in the tree structure.

For instance, in FIG. 8, in the case where the apparatus 1 is revoked, encryption keys are generated for the nodes $N_{11}$, $N_1$, and $N_0$ that are positioned on the path from the apparatus 1 to $N_0$. In the case where the apparatus 26 is revoked, encryption keys are generated for the nodes $N_{33}$, $N_3$, and $N_0$ that are positioned on the path from the apparatus 26 to $N_0$.

In the present embodiment, in order to revoke the apparatus 1 and the apparatus 26, five encryption keys Ke1 through Ke5 are generated that correspond to $N_0$, $N_1$, $N_2$, $N_{11}$, and $N_{22}$, which are the nodes positioned on the path from the apparatus 1 to $N_0$ and the nodes positioned on the path from the apparatus 26 to $N_0$, from which the duplicate nodes are excluded. Hereafter, $N_{11}$, $N_1$, $N_0$, $N_{33}$, and $N_3$, will be each referred to as a revoked node.

The revoked apparatus identifying unit 205 stores therein, as the revoked apparatus identification information, the value "111" which is the apparatus ID of the apparatus 1 and the value "332" which is the apparatus ID of the apparatus 26, as a result of an input by the operator or the like.

FIG. 9 shows a revocation table that is stored by the revoked apparatus identifying unit 205 and is based on the revoked apparatus identification information and the tree structure.

In the revocation table, each line of the table has a node ID, a revocation flag, and a selected path number. In the column showing node IDs, the node IDs of all the nodes in the tree structure except for the lowermost layer are registered. A revocation flag shows whether the node identified by a node ID is revoked or not. When the node is revoked, the revocation flag is registered as a value "1", whereas when the node is not revoked (i.e. valid), the revocation flag is registered as a value "0". A selected path number shows a set of valid path numbers among the paths connecting to the node. In a selected path number, each digit is a valid path number.

The key revocation data generating unit 206 generates a header portion of a piece of key revocation data to be recorded onto the recording medium 120, from the information stored in the key information storing unit 203 and the revocation table.

Figure 10:
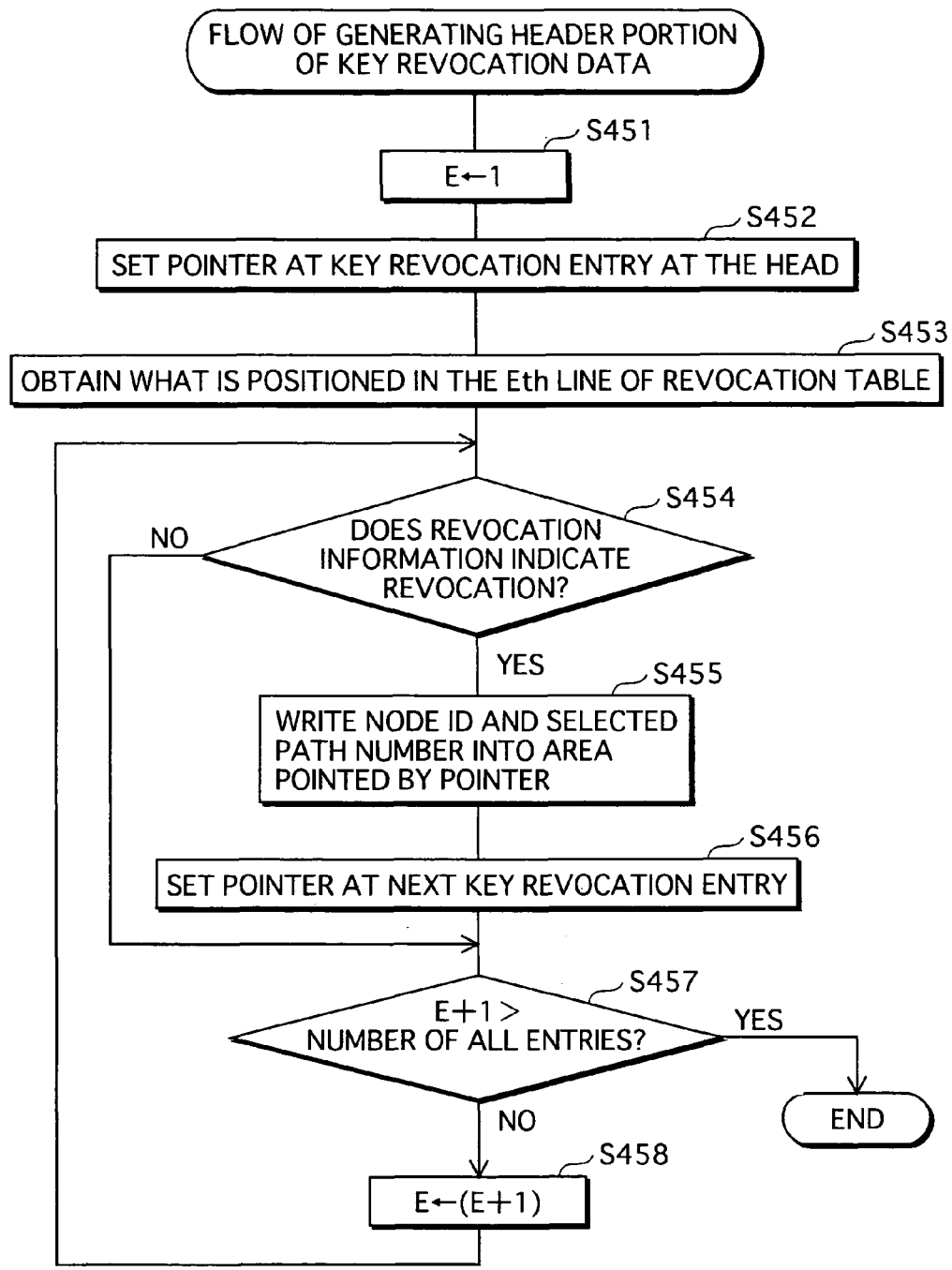
FIG. 10 is a flow chart that shows the processing performed by the key revocation data generating unit to generate the header portion of a piece of key revocation data.

FIG. 10 is a flow chart that shows the processing of generating the header portion of a piece of key revocation data, performed by the key revocation data generating unit 206, and corresponds to S105 in FIG. 2.

A piece of key revocation data includes one or more key revocation entries. A key revocation entry is made up of a node ID, a selected path number, and an encrypted media key. Of a key revocation entry, the portion besides the encrypted media key, namely, the node ID and the selected path number will be collectively referred to as a header portion of a piece of key revocation data.

The following describes the process of generating a header portion of a piece of key revocation data performed by the key revocation data generating unit 206, with reference to FIG. 10.

The key revocation data generating unit 206 has a storage area for storing key revocation data to be generated.

At first, the key revocation data generating 206 initializes the variable E to be used in the operation to 1 (S451).

The pointer to be used in the operation is set at a key revocation entry storage area being at the head (S452).

What is positioned in the $E^{th}$ line of the revocation table (hereafter, simply referred to as the entry E) is obtained (S453).

For example, with the revocation table shown in FIG. 9, for the entry E where E=1, the node ID is "0", the revocation flag is "1", and the selected path number is "2".

It is judged whether or not the revocation flag of the entry E obtained in S453 is "1", which denotes a revocation (S454).

When the revocation flag is not "1" denoting a revocation (S454: No), the procedure advances to S457.

When the revocation flag is "1" denoting a revocation (S454: Yes), the node ID of the entry E will be written as a node ID, and the selected path number of the entry E will be written as a selected path number, respectively, into the revocation information entry storage area at the position to which the pointer points (S455).

The key revocation data generating unit 206 sets the pointer so that it points to the next revocation information entry storage area (S456).

Then, it is judged whether or not E+1 is larger than the number of lines included in the revocation table (S457).

When E+1 is larger (S457: Yes), the processing is finished.

When E+1 is smaller than or equal to the number of lines (S457: No), E is incremented (S458).

FIGS. 11A and 11B show data structures of pieces of key revocation data to be recorded onto a recording medium.

FIG. 11A shows a piece of key revocation data in a case where some of the apparatuses are revoked. FIG. 11B shows a piece of key revocation data in a case where no apparatus is revoked.

Each line in FIGS. 11A and 11B includes a "node ID", a "selected path number", and an "encrypted media key".

Through the steps from S451 to S458, the key revocation data generating unit 206 generates and writes, of the piece of key revocation data shown in FIG. 11, the header portion which is made up of a "node ID", a "selected path number", and an "encrypted media key".

The "encrypted media key" is a media key encrypted with an encryption key identical to a decryption key, and explanation thereof will be provided later.

Next, the following describes the process of generating an encryption key, performed by the key revocation data generating unit 206. An "encryption key" and a "decryption key" are identical to each other and are used for encryption and decryption of information.

Figure 12:
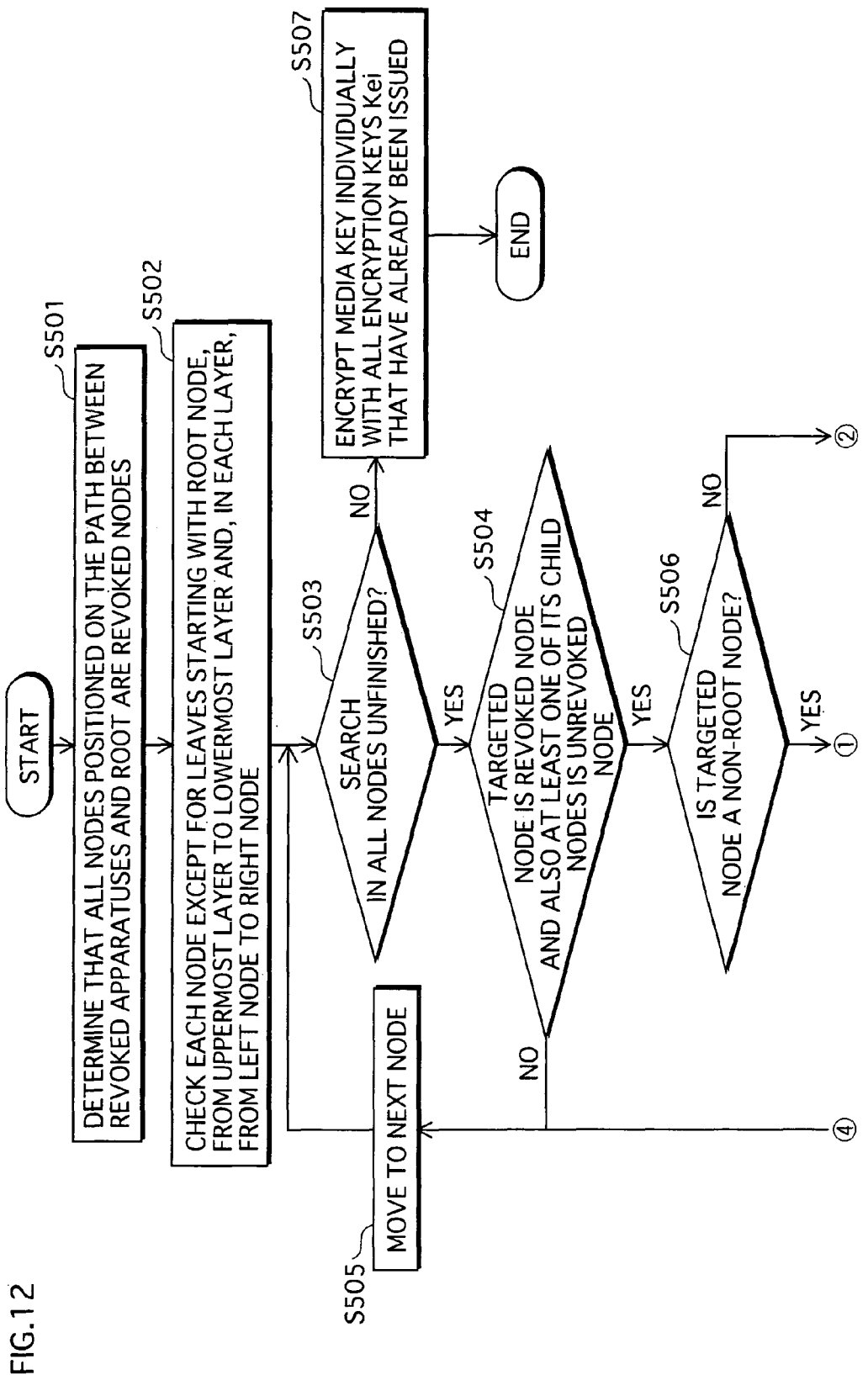
FIG. 12 is a flow chart that shows the operation for generating an encryption key.
Figure 13:
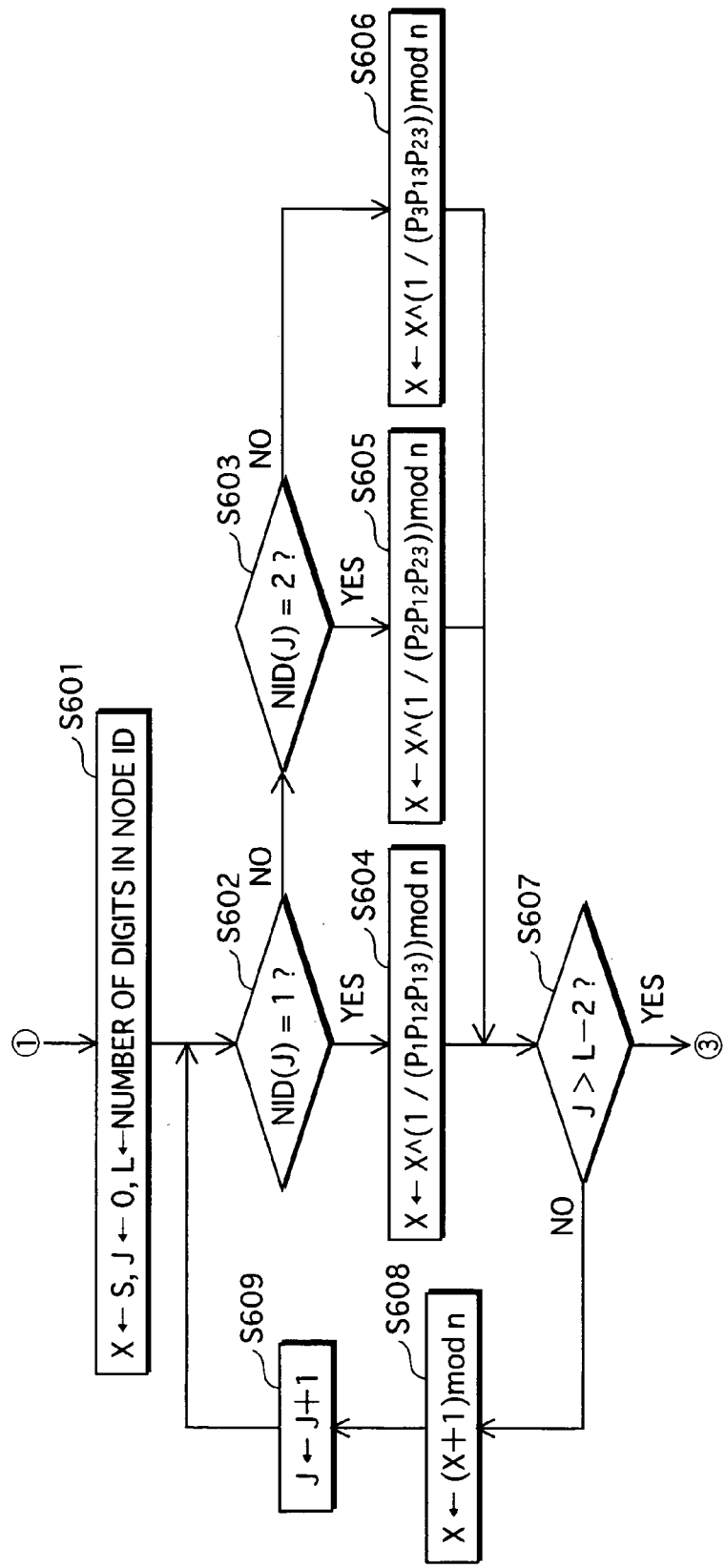
FIG. 13 is a flow chart that shows the operation for generating an encryption key.
Figure 14:
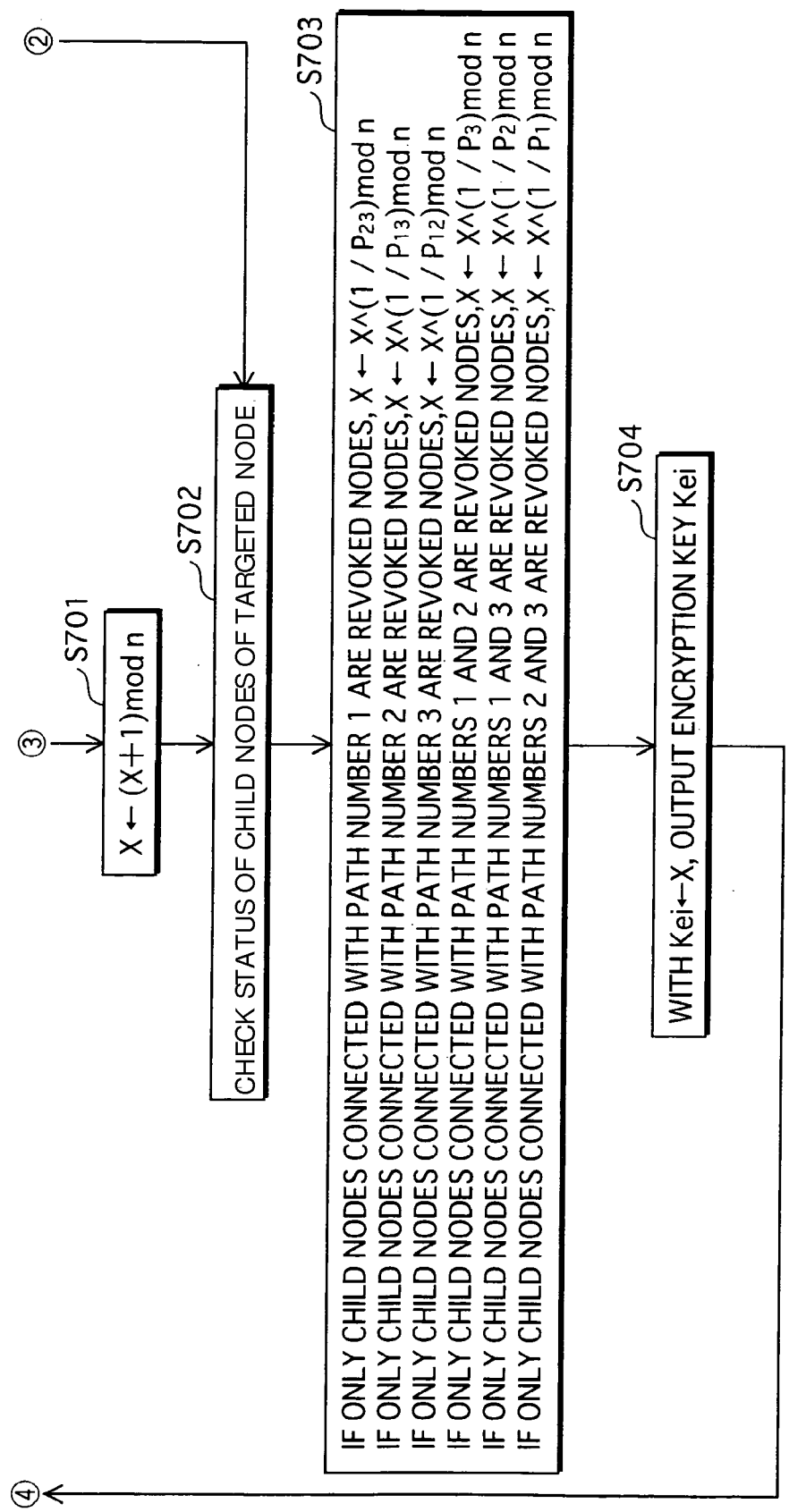
FIG. 14 is a flow chart that shows the operation for generating an encryption key.

FIGS. 12 to 14 form a flow chart that shows the operation of generating the encryption key identical to the decryption key, and corresponds to S104 in FIG. 2.

In FIG. 13, the expression "NID(J)" denotes a J'th path number counted from the lowermost digit in a node ID. For instance, when the node ID is 31, NID(1)=1, and NID(2)=3. Additionally, "root" and "root node" in the drawing each denote $N_0$.

The key revocation data generating unit 206 determines that, in the tree structure, all of the nodes positioned on the path connecting the revoked apparatuses identified by the revoked apparatus identifying unit 205 with $N_0$ are revoked nodes, and stores therein the revoked nodes (S501).

The key revocation data generating unit 206 selects each of the nodes, except for the leaves, as a processing node starting with $N_0$ in the tree structure stored in the key information storing unit 203, from the uppermost layer to the lowermost layer and, in each layer, from a node positioned on the left to a node positioned on the right (S502).

In S502, in the case where there is still a processing node to be selected, it is judged that not all the nodes have been searched yet. In the case where there is no node to be selected, it is judged that the search is completed for all the nodes (S503). In the case where the search is not completed, the procedure advances to S504. In the case where the search is completed, the procedure advances to S507.

With respect to the processing node selected in S502, it is judged whether the processing node is a revoked node and also at least one of its child nodes is an unrevoked node (S504). In the case where the processing node is a revoked node and also its child nodes include one or more unrevoked nodes, the procedure advances to S506. In the case where the processing node is an unrevoked node and in the case where its child nodes are all revoked nodes, the procedure advances to S505.

Here, "child nodes" denote nodes that are connected to a target node via paths and are positioned in a layer immediately below the target node. For example, child nodes of $N_3$ in the layer 1 are $N_{31}$, $N_{32}$, and $N_{33}$, in the layer 2.

For the processing node mentioned above, there is no need to generate an encryption key; therefore, a next processing node is selected in the same manner as in S502 (S505).

Then it is judged whether or not the processing node is the root (i.e. $N_0$) (S506). In the case where the processing node is the root, the procedure advances to S601. In the case where the processing node is not the root, the procedure advances to S702.

The media key is encrypted individually with all the encryption keys Kei that have already been issued, and pieces of key revocation data are generated (S507).

In the present embodiment, in the case where the apparatus 1 and apparatus 26 are revoked, the generated encryption keys Ke1 through Ke5 have the values shown in FIG. 8.

The key revocation data generating unit 206 initializes the variables to be used in the calculation. The random number S stored in the key information storing unit 203 is assigned to the variable X. The variable J is initialized with zero. The variable L is the number of digits in the node ID (S601). In the example shown in FIG. 3, L=2.

With respect to the processing node, it is judged whether or not the value of NID(J) is 1 (S602). In the case where the value is 1, the procedure advances to S604. In the case where the value is not 1, the procedure advances to S603.

With respect to the processing node, it is judged whether the value of NID(J) is 2 (S603). In the case where the value is 2, the procedure advance to S605. In the case where the value is not 2, the procedure advance to S606.

It should be noted that the steps of S602 and S603 are steps for selecting modular exponentiation operations to be executed for the cases where NID(J) is 1, 2, and 3, in correspondence with the ternary tree.

In the case of an a-ary tree, it is necessary to select a modular exponentiation operation for each of the cases in which NID(J) is 1, 2, ... (a−1), and a; therefore, it is necessary to perform as many steps for making judgment being equivalent to S602 (or S603) as "a−1".

For the variable X, a modular exponentiation operation is performed on the inverse elements of the prime numbers $P_1$, $P_{12}$, and $P_{13}$ (i.e. $1/P_1$, $1/P_{12}$, $1/P_{13}$), and the result is assigned to the variable X (S604).

For the variable X, a modular exponentiation operation is performed on the inverse elements of the prime numbers $P_2$, $P_{12}$, and $P_{23}$ (i.e. $1/P_2$, $1/P_{12}$, $1/P_{23}$), and the result is assigned to the variable X (S605).

For the variable X, a modular exponentiation operation is performed on the inverse elements of the prime numbers $P_3$, $P_{13}$, and $P_{23}$ (i.e. $1/P_3$, $1/P_{13}$, $1/P_{23}$), and the result is assigned to the variable X (S606).

It should be noted that the steps of S604, S605, and S606 are steps for performing modular exponentiation operations to be executed in the cases where NID(J) is 1, 2, and 3, in correspondence with the ternary tree. In the case of an a-ary tree, it is necessary to perform a modular exponentiation operation step for each of the cases in which NID(J) is 1, 2, . . . (a−1), and a. In other words, it is necessary to perform as many modular exponentiation operation execution steps being equivalent to S604 (or S605, S606) as "a". The prime numbers whose inverse elements are used in the modular exponentiation operations are all the prime numbers that correspond to NID(J)=h (where $1 \leq h \leq a$) and contain the value "h" in the selected path number in the prime number table.

Then, it is judged whether the variable J is larger then the variable L−2 (S607). In the case where the variable J is larger, the procedure advances to S701 in FIG. 14. In the case where the variable J is not larger, the procedure advances to S608.

1 is added to the variable X, and the result is assigned to the variable X (S608).

1 is added to the variable J, and the result is assigned to the variable J (S609).

1 is added to the variable X, and the result is assigned to the variable X (S701).

It is judged, with respect to the processing node, whether or not its child nodes are revoked nodes (S702).

In the case where only child nodes that are connected to the processing node with a path number 1 are revoked nodes, for the variable X, a modular exponentiation operation is performed on the inverse element of the prime number $P_{23}$ (i.e. $1/P_{23}$), and the result is assigned to the variable X (S703). In the case where only child nodes that are connected to the processing node with a path number 2 are revoked nodes, for the variable X, a modular exponentiation operation is performed on the inverse element of the prime number $P_{13}$ (i.e. $1/P_{13}$), and the result is assigned to the variable X. In the case where only child nodes that are connected to the processing node with a path number 3 are revoked nodes, for the variable X, a modular exponentiation operation is performed on the inverse element of the prime number $P_{12}$ (i.e. $1/P_{12}$), and the result is assigned to the variable X. In the case where only child nodes that are connected to the processing node with path numbers 1 and 2 are revoked nodes, for the variable X, a modular exponentiation operation is performed on the inverse element of the prime number $P_3$ (i.e. $1/P_3$), and the result is assigned to the variable X. In the case where only child nodes that are connected to the processing node with path numbers 1 and 3 are revoked nodes, for the variable X, a modular exponentiation operation is performed on the inverse element of the prime number $P_2$ (i.e. $1/P_2$), and the result is assigned to the variable X. In the case where only child nodes that are connected to the processing node with path numbers 2 and 3 are revoked nodes, for the variable X, amodular exponentiation operation is performed on the inverse element of the prime number $P_1$ (i.e. $1/P_1$), and the result is assigned to the variable X.

The calculated value of the variable X is assigned to Kei so that an encryption key Kei is outputted (S704).

The key revocation data generating unit 206 generates encryption keys Ke1 through Ke5 by performing the processing in Steps S501 to S704 and encrypts the media key km stored in the key information storing unit 203 using each of the encryption keys Ke1 through Ke5.

In the case where there is no apparatus to be revoked, the key management apparatus 100 encrypts the media key using the random S stored in the key information storing unit 203 as a sole encryption key so that the piece of key revocation data shown in FIG. 11B is recorded on the recording medium 120.

The key revocation data generating unit 206 writes the key revocation data onto the recording medium 120 via the writing unit 208.

It should be noted that the recording medium 120 is a portable recording medium such as a DVD (Digital Versatile Disc), a CD (Compact Disc), a BD (Blu-ray Disc), or the like.

Figure 15:
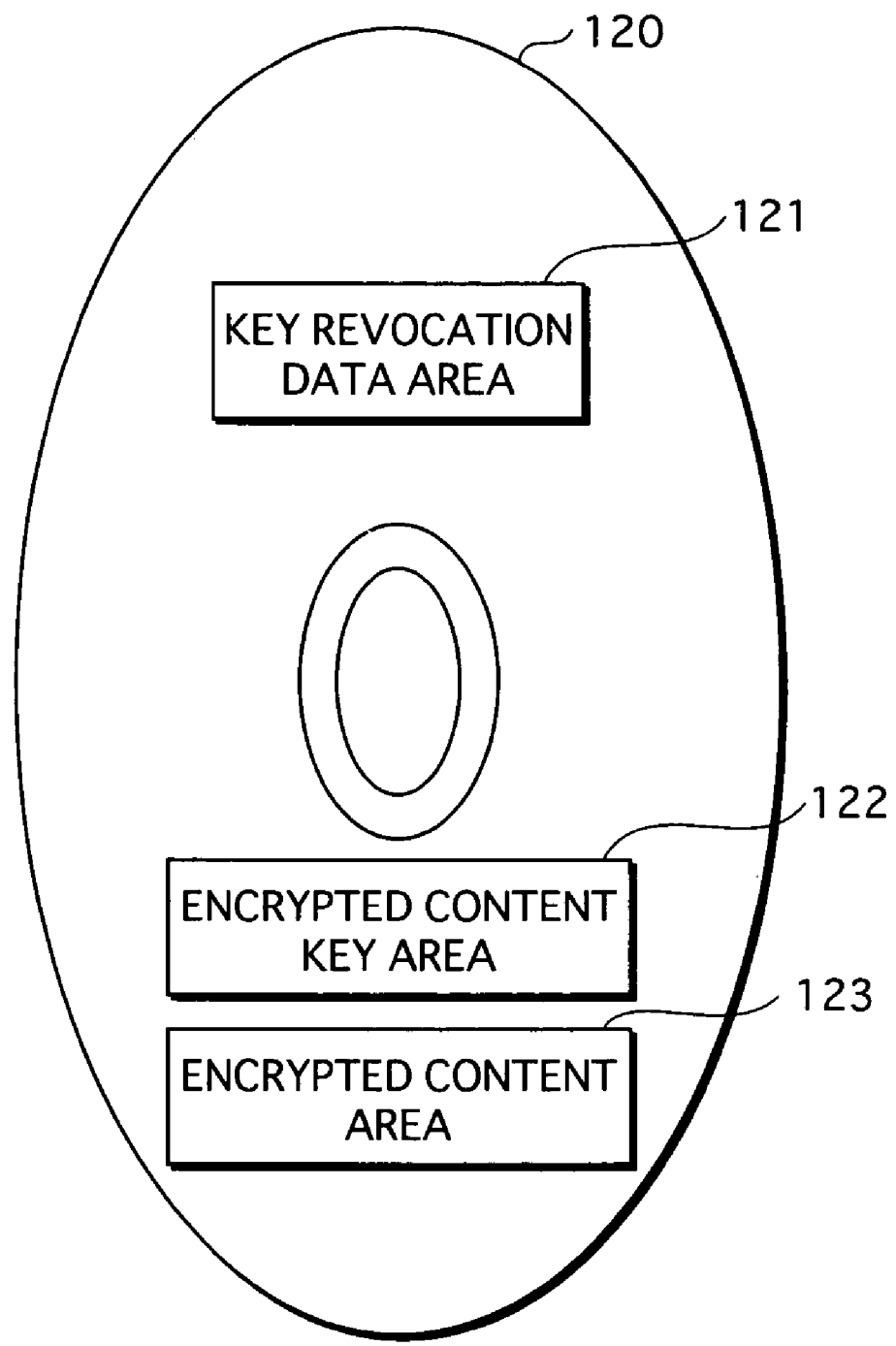
FIG. 15 shows, in a typified manner, pieces of data recorded on a recording medium.

FIG. 15 schematically shows data recorded on the recording medium 120.

The piece of key revocation data shown in FIG. 11 is recorded into the key revocation data area 121.

A content key encrypted by the recording apparatus 110 is written into the encrypted content key area 122. A content encrypted by the recording apparatus 110 using the content key is written into the encrypted content area 123.

The writing unit 208 records the encryption key generated by the key revocation data generating unit 206 onto the recording medium 120.

<The Recording Apparatus 110>

The recording apparatus 110 encrypts a content whose copyright is to be protected, using a content key stored in the recording apparatus 110, and after recording the encrypted content onto the recording medium 120, generates a media key using a device key obtained from the key management apparatus 100 and the piece of key revocation data, encrypts the content key with the media key, and to record the encrypted content key onto the recording medium 120.

Figure 16:
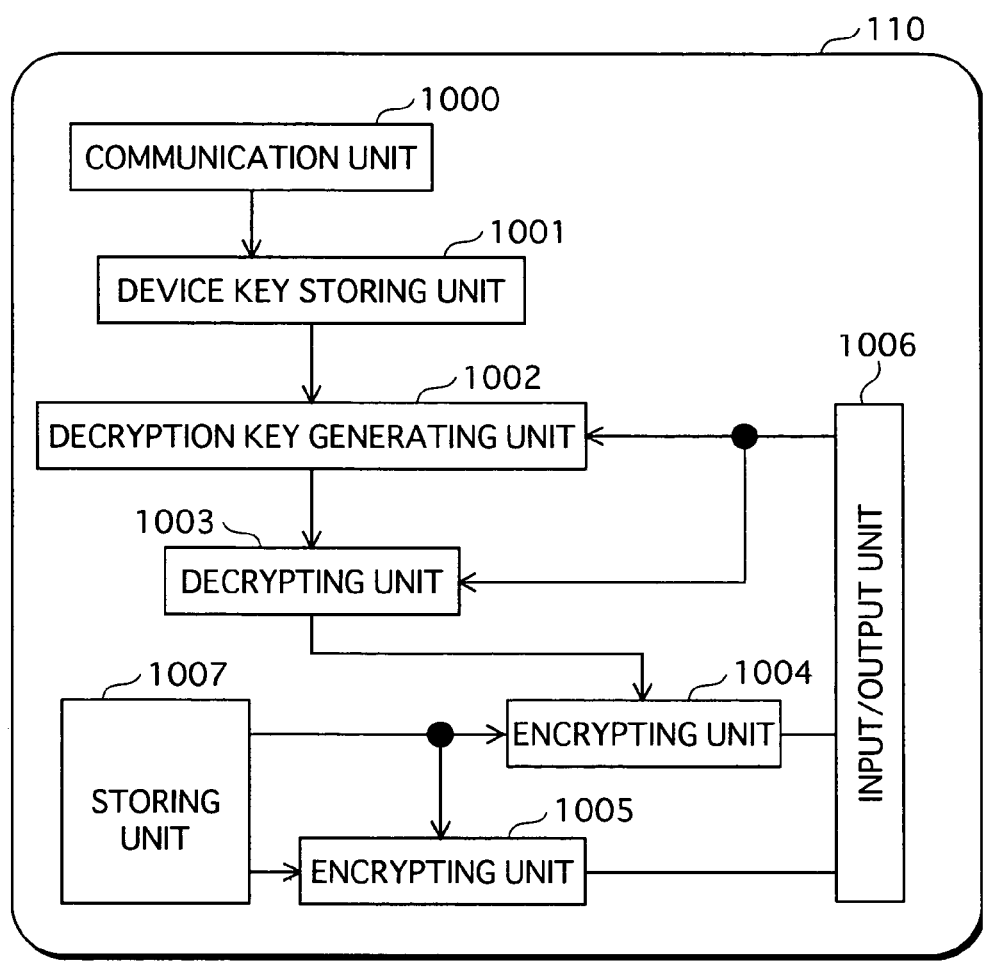
FIG. 16 is a block diagram that shows the configuration of a recording apparatus of the present invention.

FIG. 16 is a block diagram that shows the configuration of the recording apparatus 110.

The recording apparatus 110 comprises, as shown in FIG. 16, a communication unit 1000, a device key storing unit 1001, a decryption key generating unit 1002, a decrypting unit 1003, an encrypting unit 1004, an encrypting unit 1005, an input/output unit 1006, and a storing unit 1007. The recording apparatus 110 is a computer system that comprises, in terms of hardware, a CPU, a ROM, a RAM, a hard disk, a keyboard, a network adaptor, and the like. A computer program is stored in the ROM or the hard disk, and the recording apparatus 110 realizes its functions as the CPU operates according to the computer program.

In addition, as described earlier, the recording apparatus 110 is associated with a node belonging to the layer 3 which is the lowermost layer of the tree structure, and an apparatus ID is assigned to the recording apparatus 110.

The communication unit 1000 is made up of a network adaptor and its control unit and communicates with the key management apparatus 100 via a network.

The device key storing unit 1001 is made up of a storage device such as a nonvolatile memory and its control unit and stores therein a device key received by the communication unit 1000.

The decryption key generating unit 1002 reads a piece of key revocation data from the recording medium 120 via the input/output unit 1006 and calculates a decryption key using the piece of key revocation data and the device key stored in the device key storing unit 1001.

Here, the decryption key generating unit 1002 pre-stores therein six prime numbers, namely $P_1$, $P_2$, $P_3$, $P_{12}$, $P_{13}$, and $P_{23}$, that are required for generation of device keys.

The following describes the processing of calculating a decryption key performed by the decryption key generating unit 1002.

Figure 17:
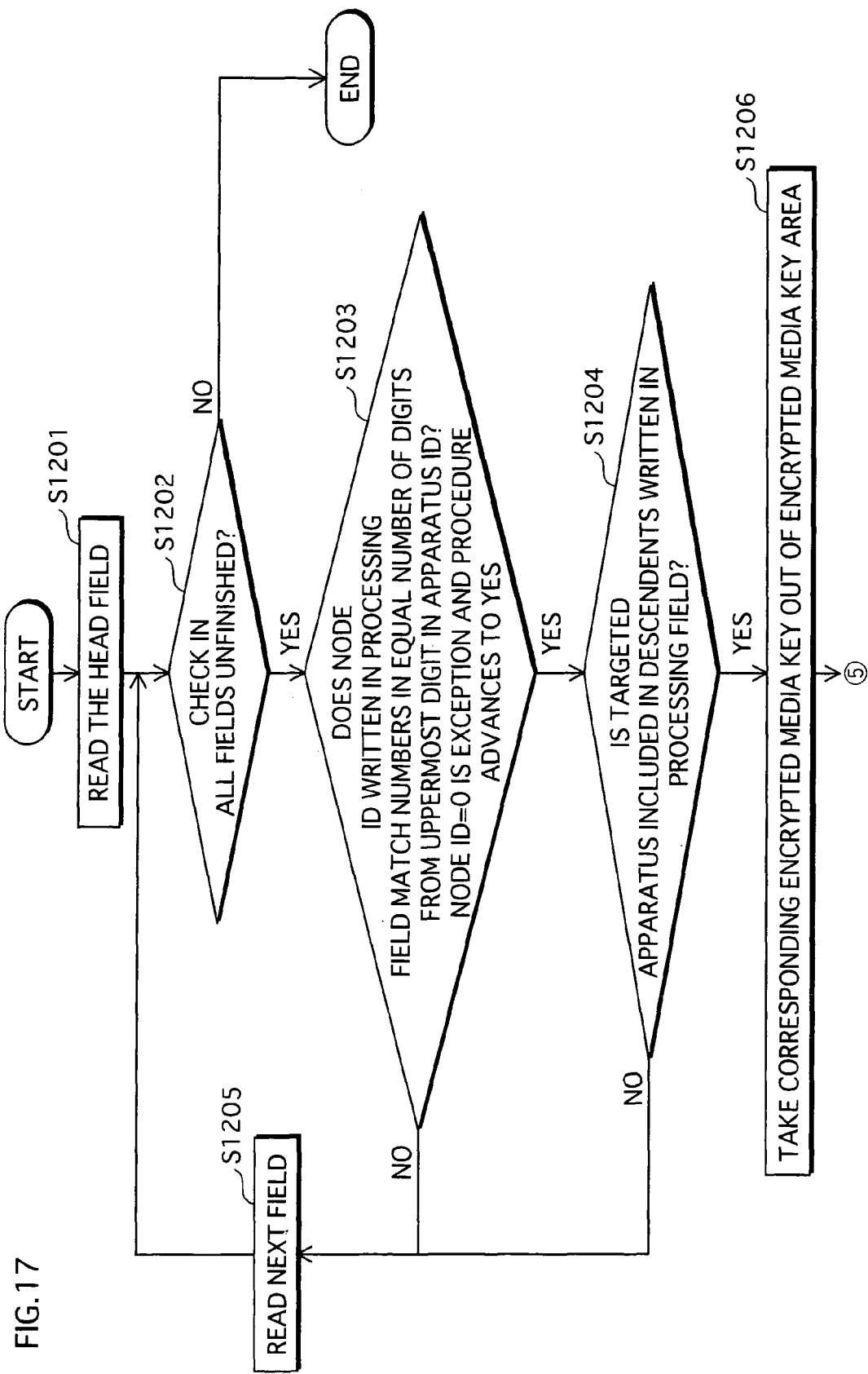
FIG. 17 is a flow chart that shows the processing for generating a decryption key.
Figure 18:
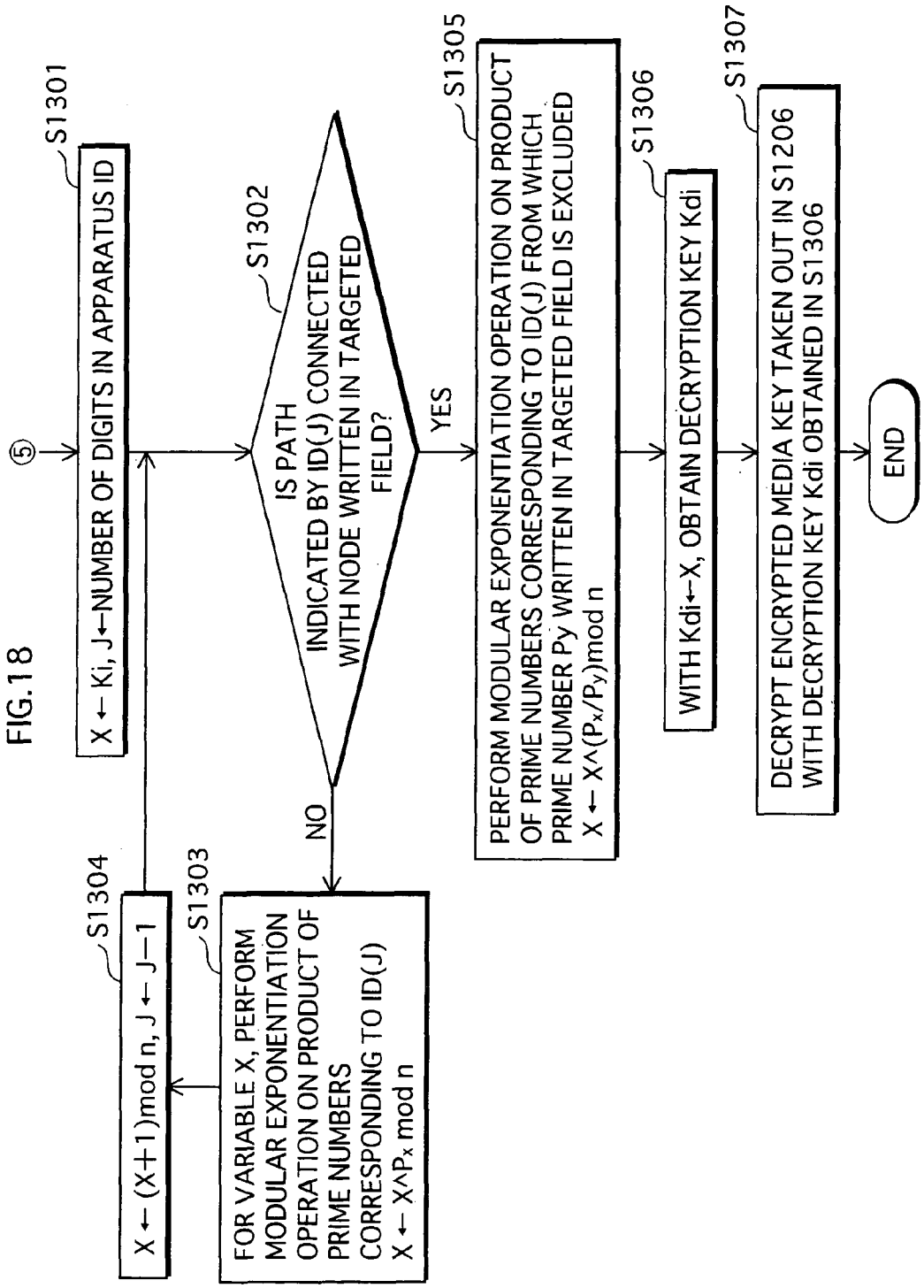
FIG. 18 is a flowchart that shows the processing for generating a decryption key.

FIGS. 17 and 18 form a flow chart that shows the processing of generating a decryption key.

The decryption key generating unit 1002 reads, as a processing field, a key revocation entry at the head of the piece of key revocation data recorded on the recording medium 120 via the input/output unit 1006 (S1201).

The decryption key generating unit 1002 judges whether or not a processing field exists (S1202). More specifically, in the case where the decryption key generating unit 1002 has read all the fields in the piece of key revocation data, and no processing field exists, the judgment result is that all the fields have been checked. In the case where a processing field exists, the judgment result is that not all the fields have been checked yet.

In the case where all the fields have been checked (S1202: NO), it means that the apparatus is revoked; therefore, the processing is finished.

In the case where not all the fields have been checked (S1202: YES), the decryption key generating unit 1002 judges whether or not the node ID written in the processing field matches a portion of the apparatus ID having equal number of digits to the node ID and being taken from the uppermost digit (S1203). It should be noted that in the case where the node ID written in the processing field is "0", it is judged that they match.

In the case where the judgment result is that they do not match (S1203: NO), the decryption key generating unit 1002 reads, as a processing field, the next key revocation entry following the key revocation entry that has been read previously (S1205).

In the case where the judgment result is that they match (S1203: YES), it is judged whether or not the node for the corresponding apparatus (belonging to the layer 3) in the tree structure is a node that can be arrived at from the node identified with the node ID written in the processing field via a path identified with the path numbers written in the processing field (hereafter, such a node will be referred to as a descendent node) (S1204).

In the case where the judgment result is that the node is not a descendent node (S1204: NO), the procedure advances to S1205.

In the case where the judgment result is that the node is a descendent node (S1204: YES), the decryption key generating unit 1002 reads, as a processing encrypted media key, an encrypted media key that corresponds to the processing field of the piece of key revocation data recorded on the recording medium 120, via the input/output unit 1006 (S1206).

The decryption key generating unit 1002 initializes the variables to be used in calculation. The device key Ki is assigned to the variable X and the number of digits in the apparatus ID is assigned to the variable J (S1301).

The decryption key generating unit 1002 judges whether or not the path indicated by ID(J) is directly connected to the node identified with the node ID written in the processing field (S1302). In FIG. 18, "ID(J)" denotes a J'th path number counted from the lowermost digit of the apparatus ID. For example, in the case of the apparatus 20 whose apparatus ID is "312", ID(1)=2, ID(2)=1, and ID(3)=3.

In the case where the path indicated by ID(J) is not directly connected (S1302: NO), for the variable X, a modular exponentiation operation is performed on the product of prime numbers corresponding to ID(J) (the product being Px), and the result is assigned to the variable X (S1303).

It should be noted that regarding the prime numbers corresponding to ID(J), $Px=P_1P_{12}P_{13}$ in the case where ID(J)=1, $Px=P_2P_{12}P_{23}$ in the case where ID(J)=2, $Px=P_3P_{13}P_{23}$ in the case where ID(J)=3.

Subsequently, 1 is added to the variable X, and the result is assigned to the variable X. 1 is subtracted from the variable J, and the result is assigned to the variable J (S1304).

In the case where the path indicated by ID(J) is directly connected (S1302: YES), for the variable X, a modular exponentiation operation is performed on what is obtained by excluding the prime numbers Py indicated by the processing field from the product of the prime numbers corresponding to ID(J), and the result is assigned to the variable X (S1305).

The "y" in the "Py" denotes a selected path number in a processing field. For instance, in the case where the selected path number is "12", Py is $P_{12}$. In the case where ID(J)=1, a modular exponentiation operation is performed on $P_1P_{13}$ that is obtained by excluding $P_{12}$ being Py from $Px=P_1P_{12}P_{13}$, and the result is assigned to the variable X.

Here, the expression "Px/Py" shown in the drawing means that $P_1P_{13}$ is calculated without using $P_{12}$. It does not mean that $Px=P_1P_{12}P_{13}$ is multiplied by the inverse element ($1/P_{12}$) of $P_{12}$ being Py.

The calculated value of the variable X is assigned to Kdi, and the decryption key Kdi is outputted (S1306).

The decryption key generating unit 1002 decrypts the encrypted media key read out in S1206 with the decryption key Kdi obtained in S1306 so as to obtain a media key (S1307).

Through the steps described above, each of the unrevoked apparatuses is able to calculate a decryption key from the device key stored in itself, and to decrypt a media key using the calculated decryption key. On the other hand, it is impossible to calculate any decryption key from a device key stored in a revoked apparatus; therefore, it is impossible to decrypt any media key.

The encrypting unit 1004 encrypts a content key stored in the storing unit 1007 using the media key decrypted by the decrypting unit 1003 and stores the encrypted content key into the encrypted content key storing unit 1012 via the input/output unit 1006.

The encrypting unit 1005 encrypts the content stored in the storing unit 1007 using the content key stored in the storing unit 1007 and writes the encrypted content into the encrypted content storing unit 1013 via the input/output unit 1006.

The input/output unit 1006 writes data into the recording medium 120 and reads data from the recording medium 120.

The storing unit 1007 pre-stores therein a content whose copyright needs to be protected and a content key to be used for encrypting the content.

<The Playback Apparatus 130>

The playback apparatus 130 stores therein a device key that has been distributed by the key management apparatus 100, reads a piece of key revocation data from the recording medium 120, obtains a media key using the device key and the piece of key revocation data, reads an encrypted content key from the recording medium 120, decrypts the encrypted content key with the media key, reads an encrypted content, decrypts the encrypted content with the content key, and plays back the decrypted content.

Figure 19:
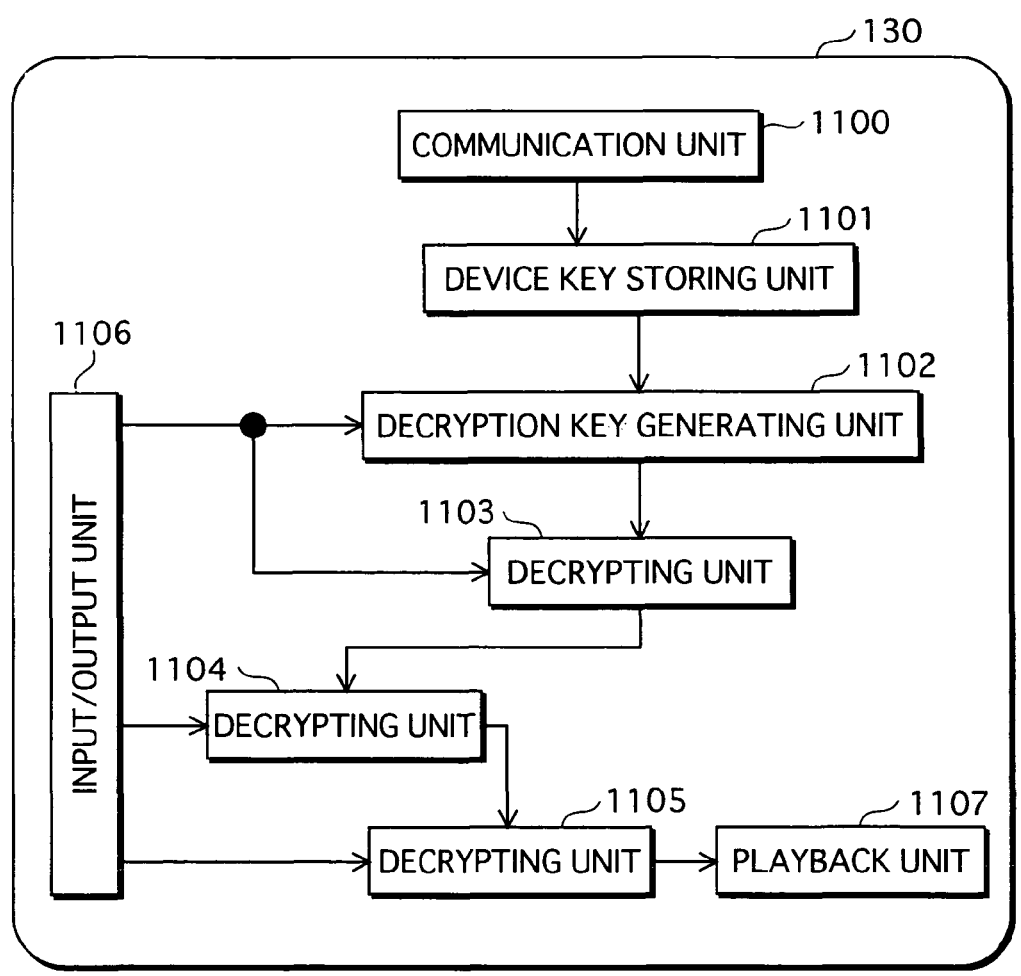
FIG. 19 is a block diagram that shows the configuration of a playback apparatus.

FIG. 19 is a block diagram showing the configuration of the playback apparatus 130.

The playback apparatus 130 comprises, as shown in FIG. 19, a communication unit 1100, a device key storing unit 1101, a decryption key generating unit 1102, a decrypting unit 1103, a decrypting unit 1104, a decrypting unit 1105, an input/output unit 1106, and a playback unit 1107. The playback apparatus 130 is a recording and playback apparatus such as a DVD recorder that comprises, in terms of hardware, a CPU (Central Processing Unit), a ROM (Read Only Memory), a RAM (Random Access Memory), a hard disk, a network adaptor, a transport decoder, a front end, and the like. A computer program is stored in the ROM or the hard disk, and the playback apparatus 130 realizes its functions as the CPU operates according to the computer program.

The communication unit 1100 is made up of a network adaptor and its control unit and communicates with the key management apparatus 100 via a network.

The device key storing unit 1001 is made up of a recording device such as a nonvolatile memory and its control unit and stores therein a device key in the case where the communication unit 1100 has obtained the device key issued by the key management apparatus 100.

Alternatively, it is acceptable that the device key is written in the ROM in advance.

The decryption key generating unit 1102 reads a piece of key revocation data from the recording medium 120 via the input/output unit 1106 and calculates a decryption key using the piece of key revocation data and the device key stored in the device key storing unit 1101.

Here, the decryption key generating unit 1102 pre-stores therein six prime numbers, namely $P_1$, $P_2$, $P_3$, $P_{12}$, $P_{13}$, and $P_{23}$, that are required for generation of device keys. Like the decryption key generating unit 1002, the decryption key generating unit 1102 calculates a decryption key according to the flow chart shown in FIGS. 17 and 18.

The generation of a decryption key performed by the decryption key generating unit 1102 may be described by replacing the input/output unit 1006 with an input/output unit

1106 and replacing the decryption key generating unit 1002 with a decryption key generating unit 1102, in the description of FIGS. 17 and 18.

Here, for example, with regard to the tree structure shown in FIG. 3, in order for the apparatus 1 to calculate the decryption key Kd4 from the device key K1, a modular exponentiation operation should be performed on $P_1P_{12}P_{13}$ with respect to the device key K1, and further a modular exponentiation operation should be performed on the inverse element of $P_{23}$, which is $1/P_{23}$. However, the prime numbers p and q under the modulus n (n: n=p×q) are secret values which are known only to the key management apparatus 100 and not known to other apparatuses. Thus, it is difficult, in terms of the amount of calculation required, for each of the other apparatuses to calculate the inverse element $1/P_{23}$ from the prime number $P_{23}$.

Accordingly, the apparatus 1 which is revoked is not able to obtain the decryption key Kd4 using the device key K1 stored in the apparatus 1.

For the same reason, the apparatus 1 is not able to obtain any of the decryption keys, Kd1 to Kd3 and Kd5. Further, the apparatus 26 is not able to obtain any of the decryption keys Kd1 through Kd5. Thus, it is possible to prevent illegitimate apparatus that are to be revoked from infringing on copyrights of contents.

The decrypting unit 1103 reads an encrypted media key from the recording medium 120 via the input/output unit 1106, and decrypts the encrypted media key using the decryption key generated by the decryption key generating unit 1102, so as to obtain a media key.

The decrypting unit 1104 decrypts the encrypted content key read from the recording medium 120, using the media key decrypted by the decrypting unit 1103 so as to obtain a content key.

The decrypting unit 1105 reads an encrypted content from the recording medium 120 and decrypts the encrypted content using the content key so as to obtain a content.

The input/output unit 1106 inputs and outputs information to and from the recording medium 120.

The playback unit 1107 plays back the content obtained by the decrypting unit 1105.

<Operation>

The following describes the overall operation of the copyright protection system in the case where twenty-seven apparatuses are managed by the key management apparatus 100 using ternary trees.

In the key management apparatus 100, the prime number assigning unit 201 uses ternary trees which are in the tree structure shown in FIG. 3 and generates and stores therein the prime number table shown in FIG. 5A according to the flow chart shown in FIG. 6. The six (i.e. $2^3-2$) prime numbers, namely $P_1, P_2, P_3, P_{12}, P_{13}$, and $P_{23}$, which have been generated in the generating process of the prime number table, are distributed to the recording apparatus 110 and to the playback apparatus 130 in advance. In the following example, it is assumed that the playback apparatus 130 is the apparatus 26 in the tree structure shown in FIG. 3.

Subsequently, the device key generating unit 204 generates device keys for the playback apparatuses using $P_1$ through $P_{23}$ that have been generated by the prime number assigning unit 201 and stored in the key information storing unit 203 as well as the random number S generated by the random number generating unit 202, in accordance with the flow chart shown in FIG. 7.

Here, the device key K26 for the apparatus 26 is expressed as follows:

$$K26=((S^\wedge(1/(P_3P_{13}P_{23}))+1)^\wedge(1/(P_3P_{13}P_{23}))+1)^\wedge(1/(P_2P_{12}P_{23}))$$

The generated device key K26 is distributed to the apparatus corresponding to K26, which is the playback apparatus 130, via the transmitting unit 207.

In the playback apparatus 130, the communication unit 1100 receives K26, and the device key storing unit 1101 stores therein K26.

The following describes the operation up to when the playback apparatus plays back a content for different cases where there is no revoked apparatus, where the apparatus 26 is not one of revoked apparatuses, and where the apparatus 26 is one of revoked apparatuses.

<In the Case Where There is No Revoked Apparatus>

In the case where there is no revoked apparatus, in the key management apparatus 100, the key revocation data generating unit 206 generates a piece of key revocation data shown in FIG. 11B, not in accordance with the flow chart in FIG. 10. The writing unit 208 records the piece of key revocation data onto the recording medium 120.

The recording medium 120 on which the piece of key revocation data is recorded is transferred to the recording apparatus 110.

Subsequently, the recording apparatus 110 generates a decryption key S, using the piece of key revocation data recorded on the recording medium 120 and the device key for an unrevoked apparatus which is K26 in the present example, in accordance with the flow chart shown in FIGS. 12 through 14.

The recording apparatus 110 decrypts the encrypted media key recorded in the piece of key revocation data, using the decryption key S so as to obtain a media key.

The recording apparatus 110 encrypts the content stored in the storing unit 1007, using the content key stored also in the storing unit 1007, records the encrypted content into the encrypted content area 123 of the recording medium 120, encrypts the content key using the media key, and records the encrypted content key into the encrypted content key area 122.

The recording medium 120 is distributed, for example through sale, and transferred into the hand of the owner of the playback apparatus 130 so as to go through the playback processing performed by the playback apparatus 130.

In the playback apparatus 130, the decryption key generating unit 1102 generates the decryption key S from the device key K26, using the piece of key revocation data, in accordance with the flow chart shown in FIGS. 17 and 18.

The decrypting unit 1103 decrypts the encrypted media key recorded in the piece of key revocation data, using the decryption key S so as to obtain a media key. The decrypting unit 1104 decrypts the encrypted content key recorded on the recording medium 120, using the media key so as to generate a content key. The decrypting unit 1105 decrypts the encrypted content recorded on the recording medium 120, using the content key so as to generate a content. The playback unit 1107 plays back the content.

<In the Case Where the Playback Apparatus 130 is the Apparatus 27 Which is an Unrevoked Apparatus>

In the case where the revoked apparatuses are the apparatus 1 and the apparatus 26, in the key management apparatus 100, the key revocation data generating unit 206 generates a piece of key revocation data shown in FIG. 11A and records the generated piece of key revocation data onto the recording medium 120, in accordance with the flow chart shown in FIG. 10.

The recording medium 120 on which the piece of key revocation data is recorded is transferred to the recording apparatus 110.

Subsequently, the recording apparatus 110 generates a decryption key Ke5, using the piece of key revocation data recorded on the recording medium 120 and a device key for an unrevoked apparatus, which is K26 in the present example, in accordance with the flow chart in FIGS. 12 to 14.

The recording apparatus 110 decrypts the encrypted media key recorded in the piece of key revocation data, using the decryption key Ke5 so as to obtain a media key.

The recording apparatus 110 encrypts the content stored in the storing unit 1007 using the content key stored also in the storing unit 1007, records the encrypted content into the encrypted content area 123 of the recording medium 120, encrypts the content key using the media key, and records the encrypted content key into the encrypted content key area 122.

The recording medium 120 is distributed, for example through sale, and transferred into the hand of the owner of the playback apparatus 130 so as to go through the playback processing performed by the playback apparatus 130.

In the present example, it is assumed that the playback apparatus 130 is the apparatus 27 which is an unrevoked apparatus.

In the playback apparatus 130, the decryption key generating unit 1102 generates a decryption key Ke5 from the device key K27, using the piece of key revocation data, in accordance with the flow chart shown in FIGS. 17 and 18.

K27 is expressed as follows:

$$K27=((S\char`\^(1/(P_3P_{13}P_{23}))+1) \char`\^(1/(P_3P_{13}P_{23}))+1) \char`\^(1/(P_3P_{13}P_{23}))$$

In the tree structure shown in FIG. 3, the apparatus ID of the apparatus 27 is "333", and in the case where the first through fourth lines in the piece of key revocation data is the processing field in Step S1203 shown in FIG. 17, the judgment result is NO and the procedure advances to S1205. In the case where an entry in the fifth line of the piece of key revocation data is the processing field, the node ID "33" is identical to the upper two digits of the apparatus ID "333", which are "33"; therefore, the judgment result is YES and the procedure advances to S1204.

In S1204, the selected path number in the fifth line of the piece of key revocation data is "13". The apparatus 27 is connected to N33 via the path having a path number 3 in the tree structure; therefore, the decryption key generating unit 1102 judges that the apparatus 27 is one of the descendants, and the procedure advances to S1206.

The decryption key generating unit 1102 takes out E(Ke5, Km) which is a corresponding encrypted media key in S1206.

In S1301, K27 is assigned to X, and 3 is assigned to J.

In S1302, the path "3" indicated by ID(3) matches "3" within the selected path number "13"; therefore, the judgment result is YES.

In S1305, for K27, a modular exponentiation operation is performed on the inverse elements of $P_3$ and $P_{23}$, which are obtained by excluding $P_{13}$ being the selected path number from $P_3, P_{13}, P_{23}$.

$$(K27) \char`\^(P_3P_{23})=((S\char`\^(1/(P_3P_{13}P_{23}))+1) \char`\^(1/(P_3P_{13}P_{23}))+1) \char`\^(1/(P_{13}))=Ke5$$

Thus, the decryption key generating unit 1102 has successfully generated Ke5.

Subsequently, the decrypting unit 1103 decrypts the encrypted media key recorded in the piece of key revocation data, using the decryption key Ke5 so as to obtain a media key.

The decrypting unit 1104 decrypts the encrypted content key recorded on the recording medium 120, using the media key so as to generate a content key.

The decrypting unit 1105 decrypts the encrypted content recorded on the recording medium 120, using the content key so as to generate a content.

The playback unit 1107 plays back the content.

<In the Case Where the Playback Apparatus 130 is the Apparatus 26 Which is a Revoked Apparatus>

In the case where the revoked apparatuses are the apparatus 1 and the apparatus 26, in the key management apparatus 100, the key revocation data generating unit 206 generates a piece of key revocation data shown in FIG. 11A and records the generated piece of key revocation data onto the recording medium 120, in accordance with the flow chart shown in FIG. 10.

The recording medium 120 on which the piece of key revocation data is recorded is transferred to the recording apparatus 110.

Subsequently, the recording apparatus 110 generates a decryption key Ke5, using the piece of key revocation data recorded on the recording medium 120 and a device key for an unrevoked apparatus, which is K27 and not K26 in the present example, in accordance with the flow chart in FIGS. 12 to 14.

The recording apparatus 110 decrypts the encrypted media key recorded in the piece of key revocation data, using the decryption key Ke5 so as to obtain a media key.

The recording apparatus 110 encrypts the content stored in the storing unit 1007 using the content key stored also in the storing unit 1007, records the encrypted content into the encrypted content area 123 of the recording medium 120, encrypts the content key using the media key, and records the encrypted content key into the encrypted content key area 122.

The recording medium 120 is distributed, for example through sale, and transferred into the hand of the owner of the playback apparatus 130 so as to go through the playback processing performed by the playback apparatus 130.

In the present example, it is assumed that the playback apparatus 130 is the apparatus 26 which is a revoked apparatus.

In the playback apparatus 130, the decryption key generating unit 1102 attempts to generate a decryption key Ke5 from the device key K26, using the piece of key revocation data in accordance with the flow chart in FIGS. 17 and 18.

However, according to the tree structure shown in FIG. 3, the apparatus ID of the apparatus 26 is "332", and in the case where the first through fourth lines in the piece of key revocation data is the processing field in Step S1203 shown in FIG. 17, the judgment result is NO and the procedure advances to S1205. In the case where an entry in the fifth line of the piece of key revocation data is the processing field, the node ID "33" is identical to the upper two digits of the apparatus ID "332", which are "33"; therefore, the judgment result is YES and the procedure advances to S1204.

In S1204, the selected path number in the fifth line of the piece of key revocation data is "13". The apparatus 26 is connected to N33 via the path having a path number 2 in the tree structure; therefore, the decryption key generating unit 1102 judges that the apparatus 26 is not one of the descendants, and the procedure advances to S1205.

The decryption key generating unit 1102 has no field to read in S1205, judges that all the fields have been checked in S1202 (S1202: YES) and finishes the processing; therefore, the decryption key generating unit 1102 is not able to generate Ke5. Further, the decryption key generating unit 1102 is not able to generate any of the decryption keys Ke1 through Ke4, either.

In addition, in order to attempt to generate Ke5 through an illegitimate procedure, it is necessary to obtain an inverse element of $P_{13}$ through calculation; however, it is difficult, in terms of the amount of calculation required, to calculate the inverse element of $P_{13}$ from the knowledge of only the modulus n, without knowing p and q to generate n.

Further, for the same reason in the case of attempting to generate Ke5, it is difficult to generate any of Ke1 through Ke4.

Thus, it is difficult to generate the media key, the content key, and the like, and the apparatus 26 is not able to playback the content.

OTHER MODIFICATION EXAMPLES (1) In the present invention, the recording medium is configured to be a recordable medium such as a DVD-RAM; however, the present invention is not limited to this configuration. For example, it is acceptable to have an arrangement wherein the recording medium is a pre-recorded medium such as a DVD-Video, and each of the playback apparatuses owns a device key and plays back the content recorded on the recording medium. In such a case, an apparatus that writes data onto the recording medium does not have to own a device key. The writing apparatus may receive a media key directly from the key management apparatus and encrypt and write the content based on the media key.

(2) The present invention has, as a mechanism for encrypting a content, an arrangement wherein, a content key is encrypted with a media key, and a content is encrypted with the content key; however, the present invention is not limited to this arrangement. For example, it is acceptable to have an arrangement wherein a content is encrypted directly with a media key so that the key hierarchy is reduced by one layer. Alternatively, to the contrary, it is acceptable to have an arrangement wherein a disc key is introduced, and the disc key is encrypted with a media key, and a content key is encrypted with the disc key, and a content is encrypted with the content key so that the key hierarchy is increased by one layer. Alternatively, it is acceptable to have an arrangement wherein the key is modulated with different type of information added somewhere in the key hierarchy.

(3) In the present invention, a piece of key revocation data and an encrypted content are recorded on a single recording medium; however, the present invention is not limited to this arrangement. For example, it is acceptable to have an arrangement where in a recording medium on which a piece of key revocation data is recorded is different from a recording medium on which an encrypted content is recorded. In such a case, firstly the recording medium having the piece of key revocation data recorded is inserted into the recording apparatus or the playback apparatus so that a media key can be calculated, and then the other recording medium is inserted so that the content can be recorded or played back.

(4) In the present invention, a piece of key revocation data and an encrypted content are recorded on a recording medium and distributed; however, the present invention is not limited to this configuration. For example, it is acceptable to have an arrangement wherein a piece of key revocation data and an encrypted content are distributed using broadcast or a communication medium such as the Internet.

(5) In the present invention, the key management apparatus uses a tree structure with ternary trees to manage keys or apparatuses; however, the present invention is not limited to this example. For example, it is acceptable that the tree structure is with binary trees or four-ary trees. In the case where the tree structure is with binary trees, the number of prime numbers to be used in generation of device keys and the like is two. In the case where the tree structure is with four-ary trees, the number of prime numbers is fourteen.

(6) In the present invention, in the step of generating a device key performed by the key management apparatus, a modular exponentiation operation is performed for each layer, and then one is added; however, the present invention is not limited to this arrangement. It is acceptable to have an arrangement, for example, wherein the value to be added is two. Moreover, the type of operation and the value to be used in the operation are not limited to this example, and the operation may be of any type that has reversibility, such as a subtraction, a multiplication, a division, or an XOR operation.

(7) In the present invention, when a media key is encrypted by the recording apparatus, the media key is directly encrypted with an encryption key calculated from a device key; however, the present invention is not limited to this example. For example, it is acceptable to have an arrangement wherein an encryption key is inputted to a compression function such as the SHA-1, and each media key is encrypted with the output value or a part of the output value. In such a case, in the playback apparatus as well, a calculated decryption key is inputted to a compression function, and a media key is decrypted with the output value or a part of the output value. Alternatively, it is acceptable to have an arrangement wherein a calculated encryption key is used to encrypt a block key that is shorter in size than the encryption key, and the block key is used for encrypting each media key. In such a case, in the playback apparatus, the block key is firstly decrypted with a calculated decryption key, and then the media key is decrypted.

(8) In the present invention, prime numbers being used are in common between layers and between nodes; however, the present invention is not limited to this arrangement. For example, it is acceptable to have an arrangement wherein different layers use different sets of prime numbers or wherein different nodes use different sets of prime numbers.

(9) In the description of the embodiments of the present invention, the one embodiment is illustrated wherein six prime numbers are used in the example with a tree structure with ternary trees. In the present invention, there is no particular restriction to these six prime numbers. It is acceptable to select six small prime numbers for the purpose of reducing the amount of calculation. To be more specific, it is acceptable to use six prime numbers such as 3, 5, 7, 11, 13, and 17, to list them in an ascending order.

(10) In the present invention, an embodiment is illustrated in which prime numbers are generated and stored in advance; however, the present invention is not limited to this example. For example, it is acceptable to have an arrangement wherein a rule for generating prime numbers is set in advance, and prime numbers are generated for an individual operation before each operation is performed.

(11) Each of the apparatuses is specifically a computer system that comprises a microprocessor, a ROM, a RAM, a hard disk unit, a display unit, a keyboard, and a mouse. A computer program is stored in the RAM or the hard disk unit. Each of the apparatuses achieves its functions when the microprocessor operates according to the computer program.

(12) The present invention may be of methods described as above. Alternatively, the present invention may be of a computer program that realizes these methods with the use of a computer, or may be of digital signals converted from such a computer program.

Additionally, it is acceptable to consider that the present invention is a computer-readable recording medium e.g. a flexible disk, a hard disk, a CD-ROM, an MO, a DVD, a DVD-ROM, a DVD-RAM, a BD (Blu-ray Disc), and a semiconductor memory, that records such a computer program or such digital signals thereon; or to consider that the present invention is such a computer program or such digital signals recorded on such a recording medium.

Further, it is acceptable to consider that the present invention is realized through transmission of such a computer program or such digital signals via telecommunication lines, wireless or wired transmission network, a network such as the Internet, or the like.

Moreover, it is acceptable to consider that the present invention is a computer system comprising a microprocessor and a memory, wherein the memory stores therein the computer program, and the microprocessor operates according to the computer program.

Furthermore, it is acceptable to execute the aforementioned program or digital signals on an independent computer system by delivering the program or digital signals recorded on a recording medium or via the aforementioned network or the like.

(13) The present invention may be considered as a combination of any of the embodiments and the modification examples.

INDUSTRIAL APPLICABILITY

The copyright protection system of the present invention is useful as technology to be a base for a system comprising a distribution system for encrypting and distributing a content whose copyright needs to be protected and a playback apparatus that decrypts and plays back an encrypted content. Such a distribution system and such a playback apparatus are, for example, manufactured by manufacturers of digital electric home appliances for playing back digital contents.

The invention claimed is:

1. A modular exponentiation operation apparatus comprising:
a storing unit storing therein an operand S, which is a natural number;
a reading unit that reads the operand S from the storing unit;
a selecting unit that selects prime numbers expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; and
a calculating unit that performs a modular exponentiation operation over a finite field, the modular exponentiation operation seeking a value expressed by $$S'=S^{1/P} \bmod N$$

where N is a product of a prime number p and a prime number q, the prime numbers p and q are larger than a predetermined value, and P is a product of all of the prime numbers selected by the selecting unit,
wherein the selecting unit includes:
a prime number storing subunit storing therein the $2^a-2$ prime numbers that are in one-to-one correspondence with all possible combinations in which a number of branches equal to all of the numbers from 1 through (a−1) are selected from among a branches each connecting to one of nodes in an a-ary tree; and
a branch obtaining subunit that obtains branch information specifying one branch out of the a branches; and
a prime number selecting subunit that selects all prime numbers being in correspondence with combinations that each include the branch specified in the branch information, from among the $2^a-2$ prime numbers stored in the prime number storing subunit, and
wherein the modular exponentiation operation apparatus further comprises:
a writing unit that overwrites the operand S stored in the storing unit with the calculated value S' such that the calculated value S' is stored as the operand S; and
a repetition control unit that controls the branch obtaining subunit, the prime number selecting subunit, the calculating unit, and the writing unit so that, on each of branches positioned on a path from a root to a leaf in the a-ary tree, starting from the root and ending with the leaf, the obtainment of branch information specifying the branch, the selection of all prime numbers being in correspondence with combinations that each include the specified branch, the modular exponentiation operation based on $S'=S^{1/P} \bmod N$, and the writing of the calculated value S' into the storing unit are repeatedly performed.

2. A modular exponentiation operation apparatus comprising:
a storing unit storing therein an operand S, which is a natural number;
a reading unit that reads the operand S from the storing unit;
a selecting unit that selects prime numbers expressed by $$\sum_{m=1}^{a-1} {}_{a-1}C_{m-1}$$

where a is a natural number being 2 or larger and m is a variable natural number being any number from 1 through a−1, from among $2^a-2$ prime numbers that are mutually different; and
a calculating unit that performs a modular exponentiation operation over a finite field, the modular exponentiation operation seeking a value expressed by $$S'=S^{1/P} \bmod N$$

where N is a product of a prime number p and a prime number q, the prime numbers p and q are larger than a predetermined value, and P is a product of all of the prime numbers selected by the selecting unit,
wherein the selecting unit includes:
a prime number storing subunit storing therein the $2^a-2$ prime numbers that are in one-to-one correspondence with all possible combinations in which a number of branches equal to all of the numbers from 1 through (a−1) are selected from among a branches each connecting to one of nodes in an a-ary tree; and
a branch obtaining subunit that obtains branch information specifying one branch out of the a branches; and
a prime number selecting subunit that selects all prime numbers being in correspondence with combinations that each include the branch specified in the branch information, from among the $2^a-2$ prime numbers stored in the prime number storing subunit, and wherein the modular exponentiation operation apparatus further comprises:

a reversible operation unit that performs a reversible operation on the calculated value S' to obtain a reversible operation result value;

a writing unit that overwrites the operand S stored in the storing unit with the reversible operation result value such that the reversible operation result value is stored as the operand S; and a repetition control unit that controls the branch obtaining subunit, the prime number selecting subunit, the calculating unit, the reversible operation unit, and the writing unit so that, on each of branches positioned on a path from a root to a leaf in the a-ary tree, starting from the root and ending with the leaf, the obtainment of branch information specifying the branch, the selection of all prime numbers being in correspondence with combinations that each include the specified branch, the modular exponentiation operation based on $S'=S^{1/P}$ mod N, the reversible operation on the calculated value S', and the writing of the reversible operation result value into the storing unit are repeatedly performed.

3. The modular exponentiation operation apparatus according to claim 2, wherein reversible operation unit obtains the reversible operation result value by adding a constant to the calculated value S'.

4. A modular exponentiation operation apparatus comprising:

a storing unit storing therein an operand S', which is a natural number;

a prime number storing unit storing therein $2^a-2$ prime numbers that are in one-to-one correspondence with all possible combinations in which a number of branches equal to all of the numbers from 1 through (a−1) are selected from among a branches each connecting to one of nodes in an a-ary tree;

an obtaining unit that obtains specification information that specifies one or more prime numbers out of the prime numbers stored in the prime number storing unit; and a calculating unit that performs a modular exponentiation operation over a finite field, the modular exponentiation operation being defined by $(S')^Q$ mod N where N is a product of a prime number p and a prime number q, the prime numbers p and q are larger than a predetermined value, and Q is a product of all of the prime numbers specified in the specification information;

a storage unit storing therein an operand S, which is a natural number;

a reading unit that reads the operand S from the storage unit;

a branch obtaining unit that obtains branch information that specifies one branch out of the a branches;

a prime number selecting unit that selects all prime numbers being in correspondence with combinations that each include the branch specified in the branch information, from among the $2^a-2$ prime numbers stored in the prime number storing unit;

a generating unit that performs a modular exponentiation operation over a finite field, the modular exponentiation operation seeking a value expressed by $R=S^P$ mod N where N is the product of the prime number p and the prime number q, the prime numbers p and q are larger than the predetermined value, and P is a product of all of the prime numbers selected by the prime number selecting unit;

a first writing unit that overwrites the operand S stored in the storage unit with the calculated value R such that the calculated value R is stored as the operand S;

a repetition control unit that controls the branch obtaining unit, the prime number selecting unit, the generating unit, and the first writing unit so that, on each of branches positioned on a path from a leaf to a node in the a-ary tree, starting from the leaf and ending with the node, the obtainment of branch information specifying the branch, the selection of all prime numbers being in correspondence with combinations that each include the specified branch, the modular exponentiation operation based on $R=S^P$ mod N, and the writing of the calculated value R into the storage unit are repeatedly performed; and a second writing unit that writes, after the repetition control unit finishes performing the control, the calculated value R such that the calculated value R is stored as S' in the storing unit.

* * * * *